US007318580B2

(12) United States Patent
Johnston et al.

(10) Patent No.: US 7,318,580 B2
(45) Date of Patent: Jan. 15, 2008

(54) VEHICLE FOR MATERIALS HANDLING AND OTHER INDUSTRIAL USES

(75) Inventors: Ronald A. Johnston, Longview, TX (US); Dwight Baker, Longview, TX (US); Nelson L. Stoldt, Longview, TX (US); Paul K. Schufeldt, Longview, TX (US); Peter J. Bradley, Longview, TX (US)

(73) Assignee: LeTourneau Technologies, Inc., Houston, TX (US)

( * ) Notice: Subject to any disclaimer, the term of this patent is extended or adjusted under 35 U.S.C. 154(b) by 0 days.

(21) Appl. No.: 11/682,871

(22) Filed: Mar. 6, 2007

(65) Prior Publication Data
US 2007/0272904 A1 Nov. 29, 2007

Related U.S. Application Data

(62) Division of application No. 10/678,579, filed on Oct. 3, 2003, now Pat. No. 7,201,244.

(51) Int. Cl.
*B66D 1/12* (2006.01)
(52) U.S. Cl. ............... 254/362; 254/323; 180/65.5
(58) Field of Classification Search ............... 254/362, 254/323, 328; 180/65.5, 65.3, 65.4; 301/6.5
See application file for complete search history.

(56) References Cited

U.S. PATENT DOCUMENTS

| 2,726,726 A | 12/1955 | Le Tourneau |
| 2,729,298 A | 1/1956 | Le Tourneau |
| 2,787,331 A | 4/1957 | Le Tourneau |
| 2,913,223 A | 11/1959 | Le Tourneau |
| 3,093,780 A | 6/1963 | Le Tourneau |
| 3,102,219 A | 8/1963 | Le Tourneau |
| 3,417,304 A | 12/1968 | Le Tourneau |

(Continued)

FOREIGN PATENT DOCUMENTS

DE 10 156 269 A1 6/2003

(Continued)

OTHER PUBLICATIONS

Declaration of Ronald A. Johnston in Support of First Information Disclosure Statement, 3 pages, (Aug. 9, 2004) with 45-page Power Point Presentation.

(Continued)

*Primary Examiner*—Emmanuel M Marcelo
(74) *Attorney, Agent, or Firm*—Akin Gump Strauss Hauer & Feld LLP

(57) ABSTRACT

A heavy duty wheeled vehicle for an industrial environment is electrically driven by one or more switched reluctance motor traction drive system connected to the wheels. The switched reluctance motors are powered by an electrical generator that is driven by an engine, such as a diesel engine, which may run at a substantially constant RPM. A digital control system provides operator displays and controls power conversion from the generator, as well as providing maintenance and control functions for the switched reluctance motors. A heavy-duty hoisting apparatus electrically drives a hoisting mechanism using an SR motor, providing power for lifting a load. The heavy-duty hoisting apparatus may include an engine and generator or provide power to the SR motor from an external source.

11 Claims, 34 Drawing Sheets

Switched Reluctance Motor System

U.S. PATENT DOCUMENTS

| | | | |
|---|---|---|---|
| 3,953,775 A | 4/1976 | Friend et al. | |
| 3,967,171 A | 6/1976 | Friend et al. | |
| 3,974,429 A | 8/1976 | Friend et al. | |
| 4,348,619 A | 9/1982 | Ray et al. | |
| 4,360,770 A | 11/1982 | Ray et al. | |
| 4,387,326 A | 6/1983 | Ray et al. | |
| 4,563,619 A | 1/1986 | Davis et al. | |
| 4,698,537 A | 10/1987 | Byrne et al. | |
| 4,943,760 A | 7/1990 | Byrne et al. | |
| 5,043,618 A | 8/1991 | Stephenson | |
| 5,072,166 A | 12/1991 | Ehsani | |
| 5,103,923 A | 4/1992 | Johnston et al. | |
| 5,283,507 A | 2/1994 | Stitt et al. | |
| 5,291,115 A | 3/1994 | Ehsani | |
| 5,351,775 A | 10/1994 | Johnston et al. | |
| 5,410,235 A | 4/1995 | Ehsani | |
| 5,449,993 A | 9/1995 | Davis | |
| 5,467,025 A | 11/1995 | Ray | |
| 5,469,039 A | 11/1995 | Stephenson et al. | |
| 5,504,410 A | 4/1996 | Davis | |
| 5,530,333 A | 6/1996 | Turner | |
| 5,539,293 A | 7/1996 | Randall et al. | |
| 5,545,964 A | 8/1996 | Stephenson et al. | |
| 5,548,173 A | 8/1996 | Stephenson | |
| 5,563,487 A | 10/1996 | Davis | |
| 5,563,488 A | 10/1996 | Stephenson et al. | |
| 5,627,445 A | 5/1997 | Webster | |
| 5,637,972 A | 6/1997 | Randall et al. | |
| 5,650,682 A | 7/1997 | Smart | |
| 5,650,799 A | 7/1997 | Melen | |
| 5,652,494 A | 7/1997 | Sugden | |
| 5,654,601 A | 8/1997 | Fulton | |
| 5,674,008 A | 10/1997 | Allinson | |
| 5,703,457 A | 12/1997 | Davis | |
| 5,705,918 A | 1/1998 | Davis | |
| 5,723,858 A | 3/1998 | Sugden | |
| 5,724,477 A | 3/1998 | Webster et al. | |
| 5,726,516 A | 3/1998 | Randall | |
| 5,736,828 A | 4/1998 | Turner et al. | |
| 5,739,615 A | 4/1998 | McClelland | |
| 5,739,663 A | 4/1998 | Brown | |
| 5,747,962 A | 5/1998 | Fulton | |
| 5,753,984 A | 5/1998 | Buchan et al. | |
| 5,760,519 A | 6/1998 | Fulton | |
| 5,760,565 A | 6/1998 | Randall | |
| 5,764,019 A | 6/1998 | Webster | |
| 5,789,893 A | 8/1998 | Watkins | |
| 5,793,179 A | 8/1998 | Watkins | |
| 5,801,935 A | 9/1998 | Sugden et al. | |
| 5,804,941 A | 9/1998 | Ray | |
| 5,808,389 A | 9/1998 | Stephenson | |
| 5,811,954 A | 9/1998 | Randall | |
| 5,814,965 A | 9/1998 | Randall | |
| 5,821,648 A | 10/1998 | Allinson | |
| 5,828,153 A | 10/1998 | McClelland | |
| 5,847,532 A | 12/1998 | Webster | |
| 5,852,355 A | 12/1998 | Turner | |
| 5,857,496 A | 1/1999 | Brown et al. | |
| 5,864,477 A | 1/1999 | Webster | |
| 5,866,966 A | 2/1999 | Fulton | |
| 5,883,590 A | 3/1999 | Sugden et al. | |
| 5,892,348 A | 4/1999 | Norman et al. | |
| 5,893,205 A | 4/1999 | McClelland | |
| 5,894,210 A | 4/1999 | Brown et al. | |
| 5,894,211 A | 4/1999 | Sugden | |
| 5,905,366 A | 5/1999 | Wilson | |
| 5,905,406 A | 5/1999 | Sugden et al. | |
| 5,923,141 A | 7/1999 | McHugh | |
| 5,926,011 A | 7/1999 | Elliott | |
| 5,949,170 A | 9/1999 | Davis | |
| 5,982,070 A | 11/1999 | Caamano | |
| 6,081,080 A | 6/2000 | Davis | |
| 6,247,233 B1 | 6/2001 | Hinton et al. | |
| 6,259,233 B1 | 7/2001 | Caamano | |
| 6,288,460 B1 | 9/2001 | Fakult et al. | |
| 6,331,365 B1 | 12/2001 | King | |
| 6,359,414 B1 | 3/2002 | Nickel | |
| 6,431,297 B1 | 8/2002 | Nakazawa | |
| 6,445,960 B1 * | 9/2002 | Borta | 700/28 |
| 6,470,696 B1 | 10/2002 | Palfy et al. | |
| 6,588,538 B2 | 7/2003 | Hinton et al. | |
| 6,603,237 B1 | 8/2003 | Caamano | |
| 6,616,569 B2 | 9/2003 | Hoang et al. | |
| 6,653,817 B2 * | 11/2003 | Tate et al. | 320/132 |
| 6,684,483 B2 | 2/2004 | Rahman et al. | |
| 6,717,381 B2 | 4/2004 | Inagaki et al. | |
| 6,731,083 B2 * | 5/2004 | Marcinkiewicz | 318/254 |
| 6,737,822 B2 | 5/2004 | King | |
| 6,744,164 B2 | 6/2004 | Kadoya et al. | |
| 6,838,854 B2 | 1/2005 | Inagaki et al. | |
| 6,841,966 B2 | 1/2005 | Umemura et al. | |
| 6,856,035 B2 | 2/2005 | Brandon et al. | |
| 6,864,658 B1 | 3/2005 | Torrey et al. | |
| 6,879,080 B2 | 4/2005 | Caamano | |
| 6,880,654 B2 * | 4/2005 | Plishner | 180/65.6 |
| 6,883,959 B2 * | 4/2005 | Donthnier et al. | 366/203 |
| 7,014,354 B2 * | 3/2006 | Donthnier et al. | 366/203 |
| 2003/0164655 A1 | 9/2003 | Biais et al. | |
| 2004/0133332 A1 | 7/2004 | Yakes et al. | |
| 2005/0072608 A1 | 4/2005 | Johnston et al. | |
| 2005/0137060 A1 | 6/2005 | Kuras et al. | |
| 2006/0170389 A1 | 8/2006 | Adra | |

FOREIGN PATENT DOCUMENTS

| | | |
|---|---|---|
| EP | 414507 B1 | 2/1991 |
| EP | 763883 A3 | 3/1993 |
| EP | 601818 B1 | 6/1994 |
| EP | 609800 A1 | 8/1994 |
| EP | 702448 B1 | 3/1996 |
| EP | 713286 B1 | 5/1996 |
| EP | 734117 B1 | 9/1996 |
| EP | 735652 B1 | 10/1996 |
| EP | 752753 B1 | 1/1997 |
| EP | 756373 B1 | 1/1997 |
| EP | 763883 A2 | 3/1997 |
| EP | 769844 B1 | 4/1997 |
| EP | 800277 A2 | 10/1997 |
| EP | 801464 A1 | 10/1997 |
| EP | 802620 B1 | 10/1997 |
| EP | 813289 B1 | 12/1997 |
| EP | 843405 B1 | 5/1998 |
| EP | 848491 B1 | 6/1998 |
| EP | 855791 B1 | 7/1998 |
| EP | 859453 B1 | 8/1998 |
| EP | 805579 A2 | 9/1998 |
| EP | 805579 A3 | 9/1998 |
| EP | 877232 A2 | 11/1998 |
| EP | 678972 B1 | 12/1998 |
| EP | 866370 A3 | 12/1998 |
| EP | 883042 B1 | 12/1998 |
| EP | 886370 A2 | 12/1998 |
| EP | 886370 A3 | 12/1998 |
| EP | 890374 B1 | 1/1999 |
| EP | 892490 A1 | 1/1999 |
| EP | 877232 A3 | 11/1999 |
| EP | 800277 A3 | 9/2000 |
| EP | 817365 B1 | 5/2001 |
| EP | 692862 B1 | 4/2003 |
| GB | 2274361 A | 1/1993 |
| WO | 2004/055958 | 7/2004 |

OTHER PUBLICATIONS

LeTourneau, Inc., "T-2200 Mine Haul Truck," 6 pages (May 1995).
LeTourneau, Inc., "LeTourneau PCM-350SS Solid-State Marine Pedestal Crane," 2 pages (Mar. 2002).
Marathon LeTourneau, "Prime Movers OEM Electric Drive Systems and Components," 4 pages, undated.
LeTourneau, Inc., "L-2350 Loader Specifications," 6 pages (Mar. 2002).
LeTourneau, Inc., "The New Absolute, Letourneau 50 Series Wheel Loaders," 16 pages, undated.
LeTourneau, Inc., "LeTourneau Loaders L-1400/L-1800," 14 pages, undated.
LeTourneau, Inc., "5092, 5094 Log Stacker Specifications," 4 pages (May 1997).
LeTourneau, Inc., "JC-40 JIB Crane Specifications," 4 pages (Aug. 2001).
LeTourneau, Inc., "LeTourneau Multi-Purpose Mobile Pick and Carry Crane," 4 pages (Apr. 1995).
LeTourneau, Inc., "SST-100 Straddle Hoist Specifications," 4 pages (Apr. 1999).
LeTourneau, Inc., "5082 Letro Porter," 4 pages (Jan. 1996).
Switched Reluctance Drives, Ltd., "Revolutionising Motor Technology," 49 pages (copyright 2000).
Freescale Semiconductor, Inc., Switched Reluctance Motor, http://www.freescale.com/webapp/sprs/site/overview.jsp?nodeld=02nQXG4rrlPb02R, May 22, 2006.
B. Fahimi, G. Suresh, & M. Ehsani, Large Switched Reluctance Machines: A 1MW Case Study, Electronic Machines and Drives, 1999 International Conference, May 1999, pp. 84-86.
Robert B. Inderka & Rika A. DeDoncker, High-Dynamic Direct Average Torque Control for Switched Reluctance Drives, IEEE Transactions on Industry Applications, vol. 39, No. 4, Jul./Aug. 2003, pp. 1040-1045.

* cited by examiner

Switched Reluctance Motor

THE STATOR

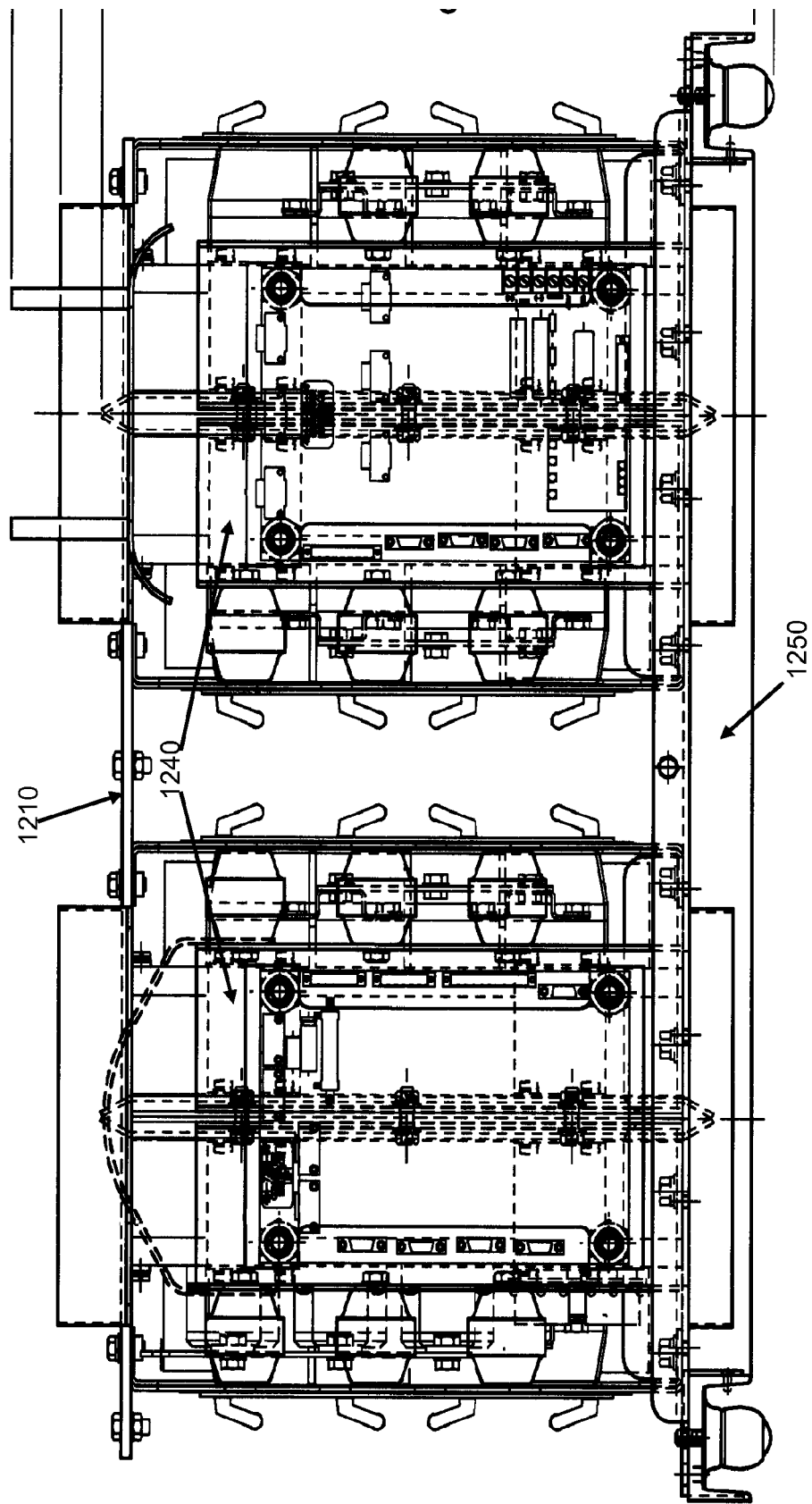

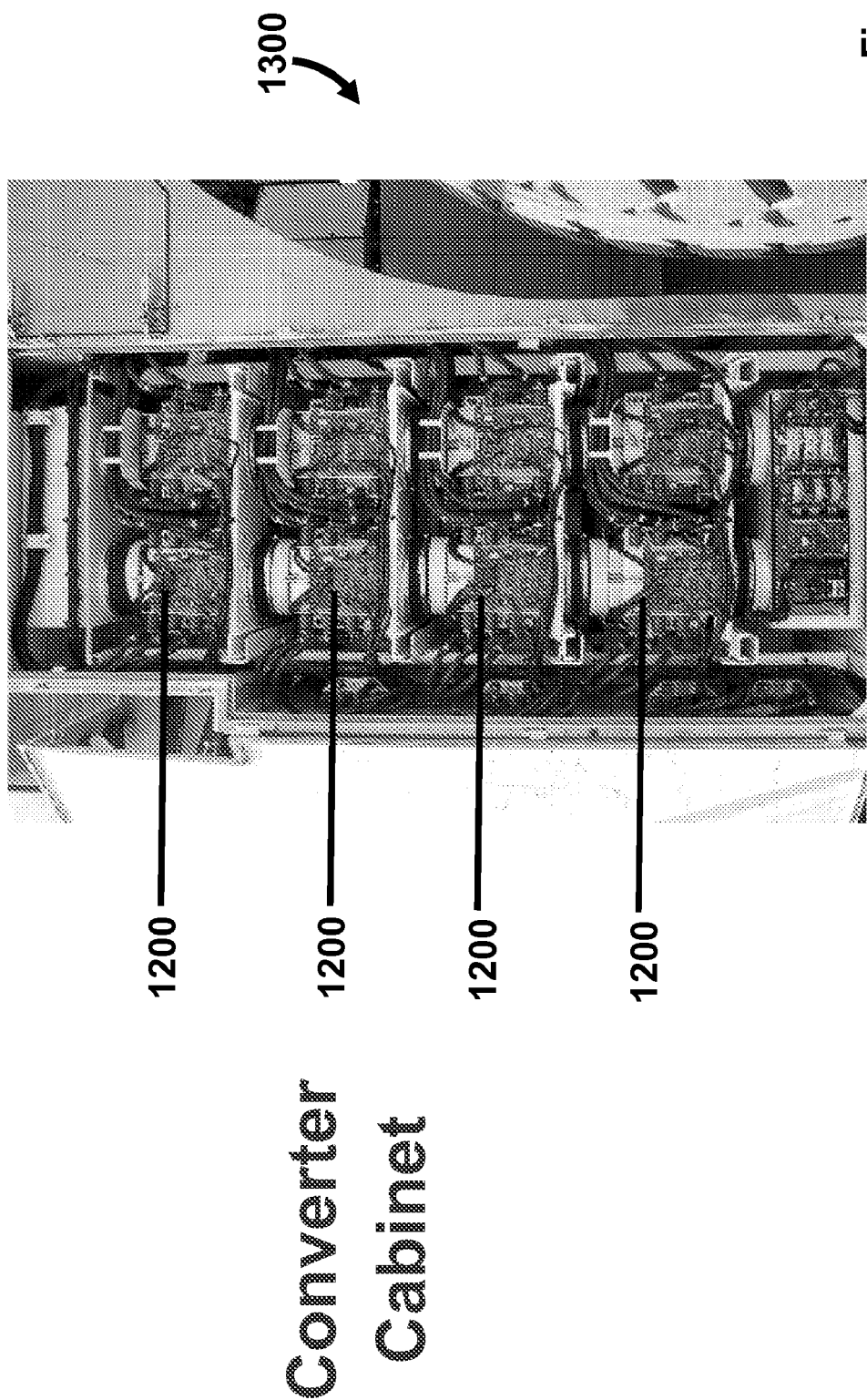

Fig. 20 SR POWER FLOW DIAGRAM

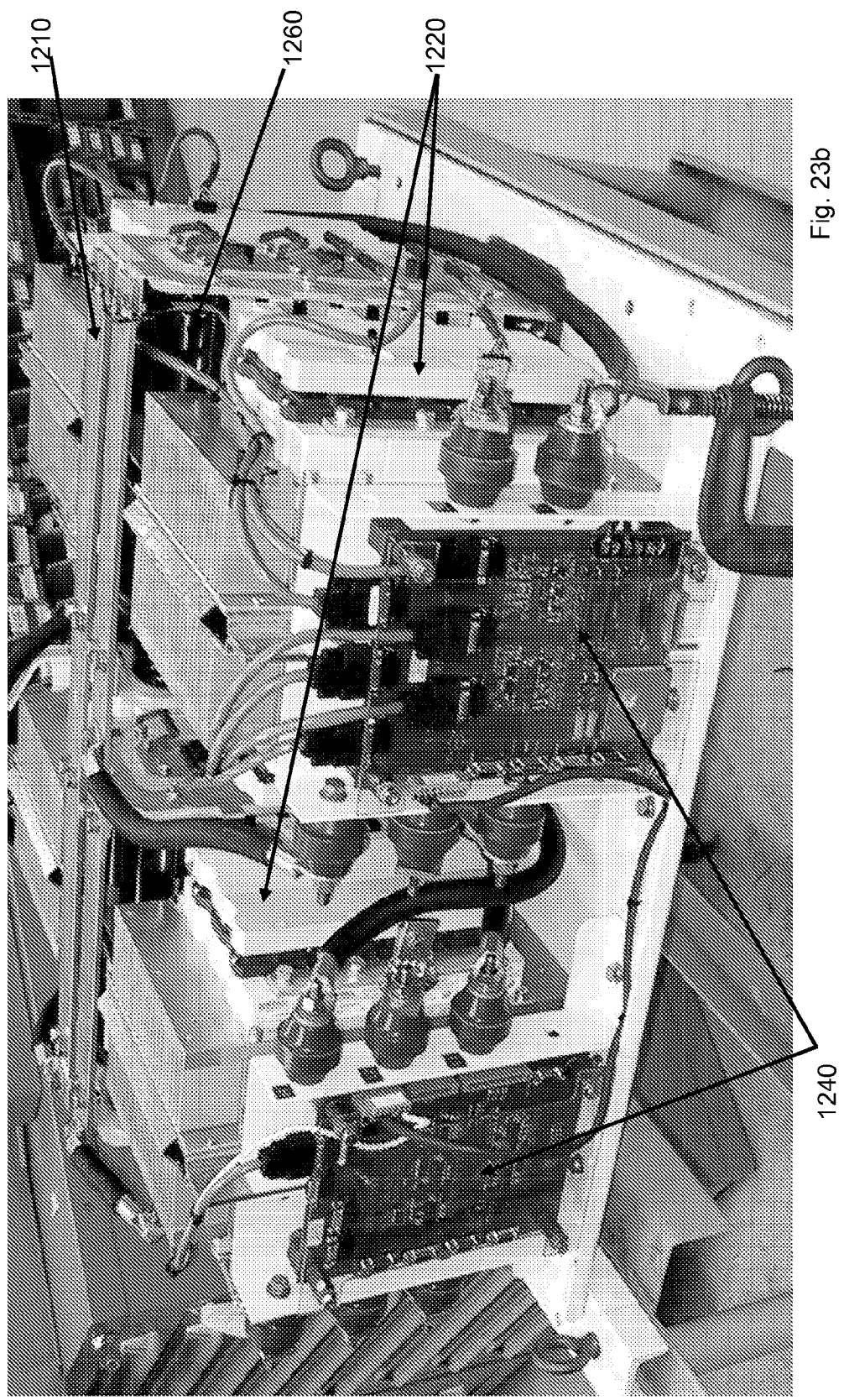

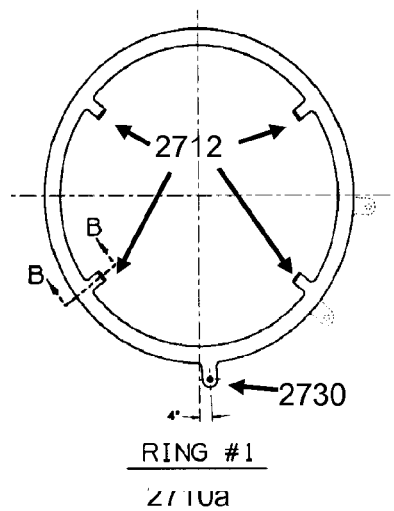
RING #1
2710a
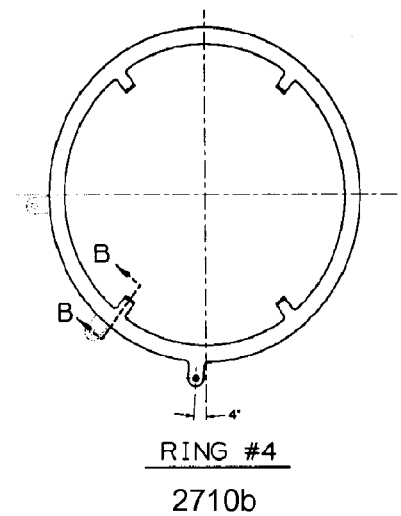
RING #4
2710b
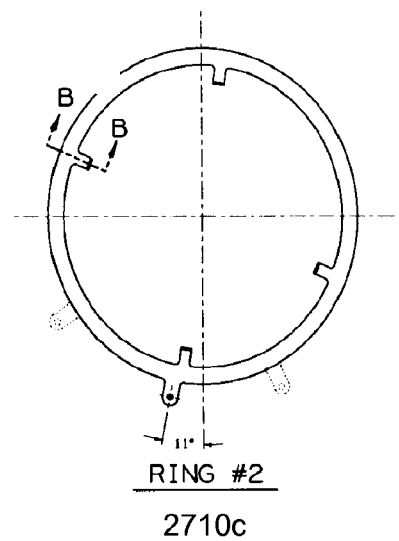
RING #2
2710c
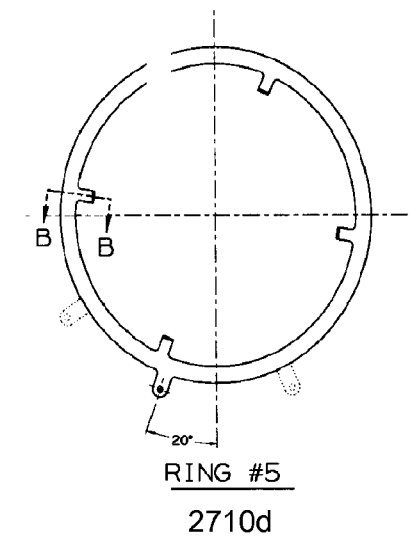
RING #5
2710d
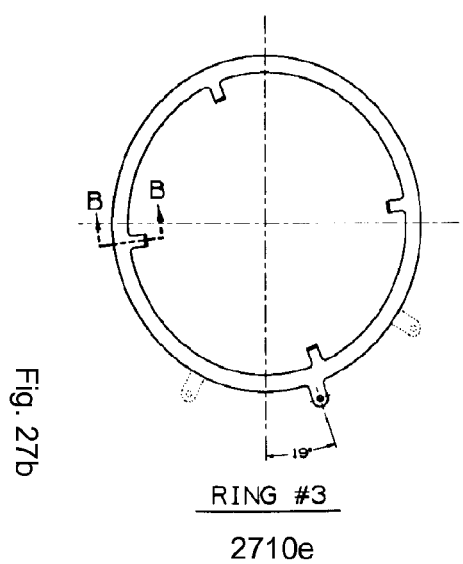
RING #3
2710e
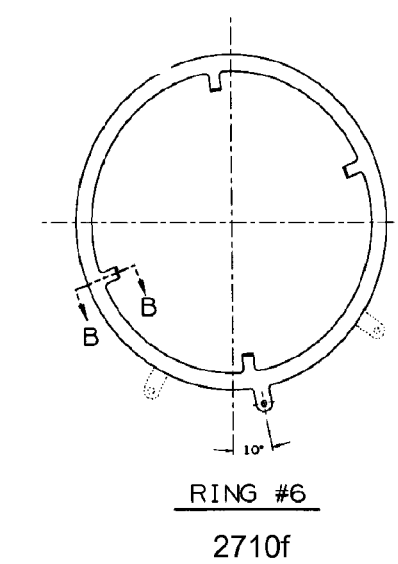
RING #6
2710f
Fig. 27b

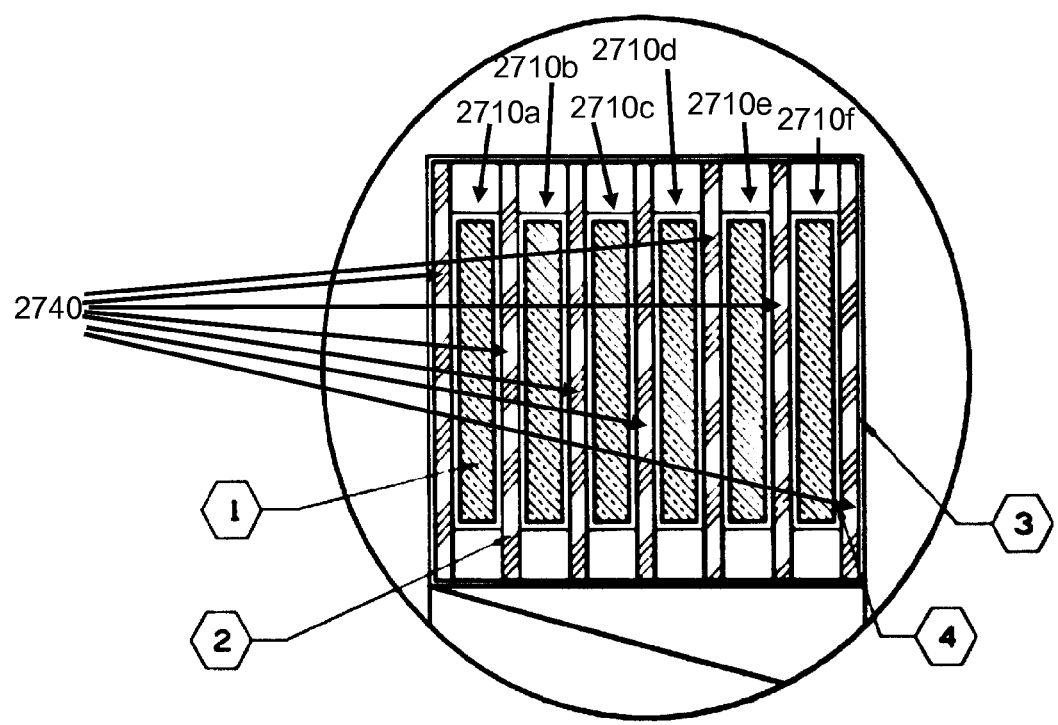
DETAIL A    Fig. 27c

VEHICLE FOR MATERIALS HANDLING AND OTHER INDUSTRIAL USES

BACKGROUND OF THE INVENTION

1. Field of the Invention

The present invention relates to a system for electrically driving a heavy-duty materials handling apparatus, and in particular to a system for using a switched reluctance motor for electrically driving one or more wheels of a heavy-duty industrial materials handling vehicle, or a vehicle for other industrial applications.

2. Description of the Related Art

Mining, earth-moving, forestry, construction, and transportation industries, among others, use large, heavy-duty equipment for handling various types of materials, in various forms ranging from loose material, such as dirt or rocks, to large heavy objects, such as containers. The materials handling equipment may be self-propelled mobile vehicles or stationary equipment. An example of a heavy-duty materials handling mobile vehicle is a loader, commonly used in the mining industry for scooping up loose material and transporting the material to a truck for transport. An example of a stationary material handler is a jib crane used for log stacking. Numerous other forms of heavy-duty materials handling equipment are known, such as wheel dozers, stackers, straddle hoist cranes, and side porters. The mobile vehicles are typically off-road rubber-tired vehicles, where "rubber" is the commonly used name for various elastomeric materials used for tires, without limiting those tires to ones that contain natural rubber. Other forms of heavy-duty industrial vehicles include locomotives.

Historically, such rubber-tired heavy-duty equipment used diesel engines, with mechanical drive systems or transmissions, and gearing to drive the wheels of the vehicles. However, approximately fifty years ago, Le Tourneau, Inc., the assignee of the present invention, introduced electric drive systems to replace the mechanical drive systems.

The advantages of an electric drive system over the conventional drive have been proven by years of successful service of log stackers, front-end loaders, haul trucks and other heavy-duty material and container handling equipment.

In conventional electric drive machines, the utilization of solid-state power conversion and control, coupled with digital management gives additional advantages, such as reliability and ease of maintenance.

Digital control and management modules of conventional electric drive machines keep track of all the machine systems, producing controls for the electrical and hydraulic systems, commands for the engine and traction systems, and feedback, history and status information for all the systems. A display screen and keypad control may allow automatic and requested information to be displayed for a vehicle operator.

However, conventional electric drive systems have their own disadvantages, frequently related to the complexity of manufacture, operation, and maintenance of the electric traction drive motors, which conventionally have been alternating current (AC) or direct current (DC) motors.

Switched reluctance (SR) motor technology is also well known. Switched Reluctance Drives Ltd. of Harrogate, United Kingdom has developed multiple designs of SR motors or drives for various applications, including a 400 HP SR motor for a conveyor belt in a mining operation. In so far as known, however, there has been no application of SR motors to wheel-driven technology for large industrial or off-road vehicles, which present special problems in acceleration and deceleration as well as over-all control because of the size and weight of such vehicles, or for large industrial hoisting equipment, which present special problems in hoisting control because of the weight of material being hoisted.

SUMMARY OF THE INVENTION

A heavy-duty vehicle adapted for use in an industrial environment comprises a heavy-duty vehicle frame; a plurality of wheels mounted with the vehicle frame, each of the wheels adapted for engagement with a surface such as land; an engine mounted with the vehicle frame; an electrical generator operatively engaged with and driven by the engine; a first switched reluctance (SR) motor operably engaging a first wheel of the plurality of wheels, the first SR motor powered by the electrical generator; and a digital control system coupled to the SR motor for controlling the SR motor individually, and for driving the vehicle. In one embodiment, a heavy-duty materials handling system is mounted with the vehicle frame. In one embodiment, a single SR motor may drive multiple wheels of the vehicle. In another embodiment, multiple SR motors may be used, each driving individual wheels of the vehicle.

A heavy-duty hoisting apparatus adapted for use in an industrial environment comprises a heavy-duty frame, a heavy-duty lifting apparatus, mounted with the frame, an SR motor operably engaging the heavy-duty lifting apparatus, and a digital control system coupled to the SR motor for controlling the SR motor individually, and for lifting objects with the heavy-duty lifting apparatus and for controlling the hoisting apparatus.

BRIEF DESCRIPTION OF THE DRAWINGS

A better understanding of the present invention can be obtained when the following detailed description of the disclosed embodiments is considered in conjunction with the following drawings, in which:

FIGS. 12a-12c are three views of a power converter module of an exemplary SR motor system of an embodiment;

FIG. 13 is a photograph of a power converter cabinet illustrating the power converter modules of FIGS. 12a-12c as installed in an embodiment;

FIGS. 23a-23b are photographs of two views of a power converter assembly for an SR motor of an embodiment;

FIG. 24c is a cross-section view of the coil of FIG. 24a;

FIGS. 27a-27c are views of a phase ring for providing electrical connections to the winding coils of an SR motor of an embodiment.

DETAILED DESCRIPTION OF THE INVENTION

Figure 2:
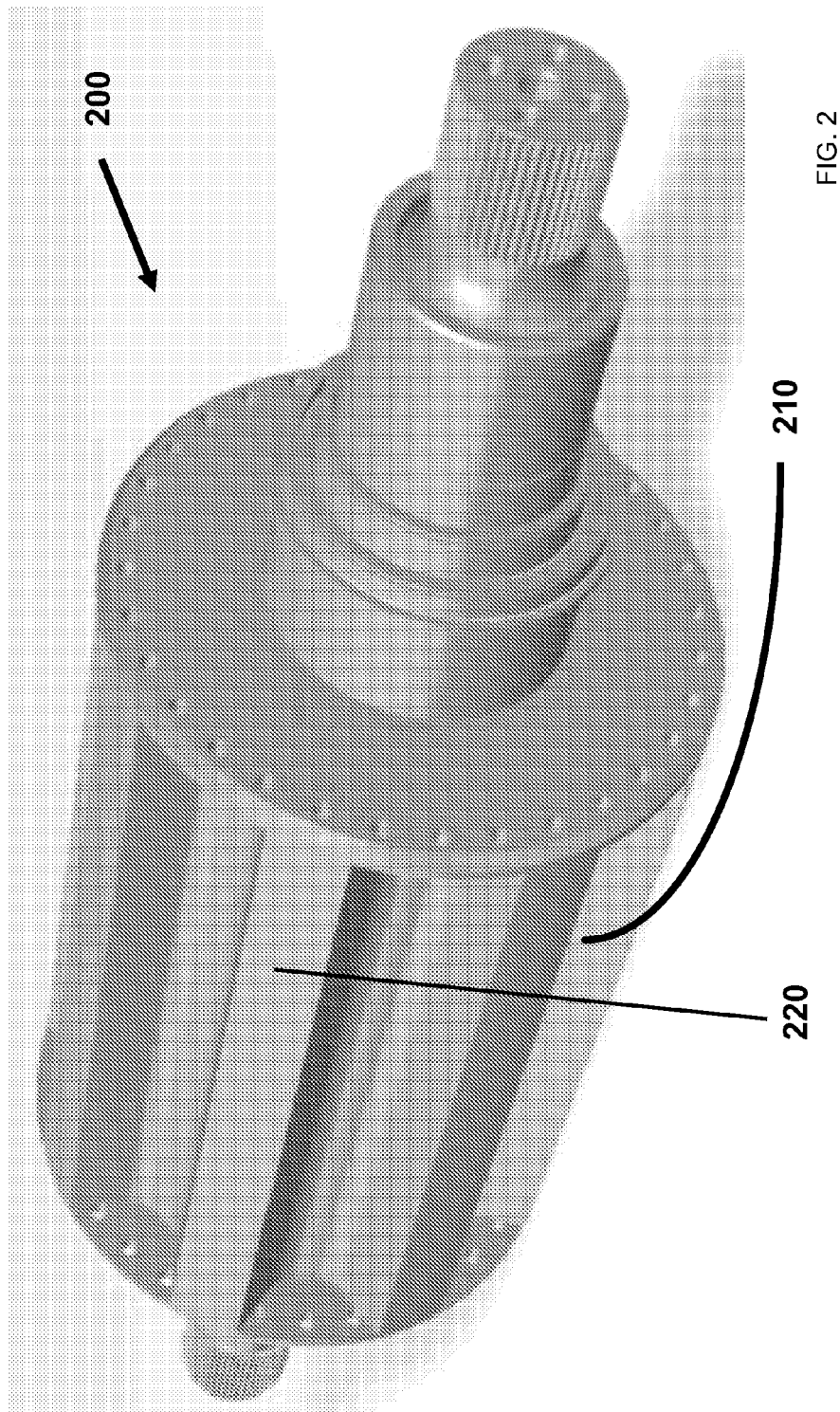
FIG. 2 is a drawing of a rotor of an exemplary SR motor for a disclosed heavy-duty vehicle of an embodiment.
Figure 3:
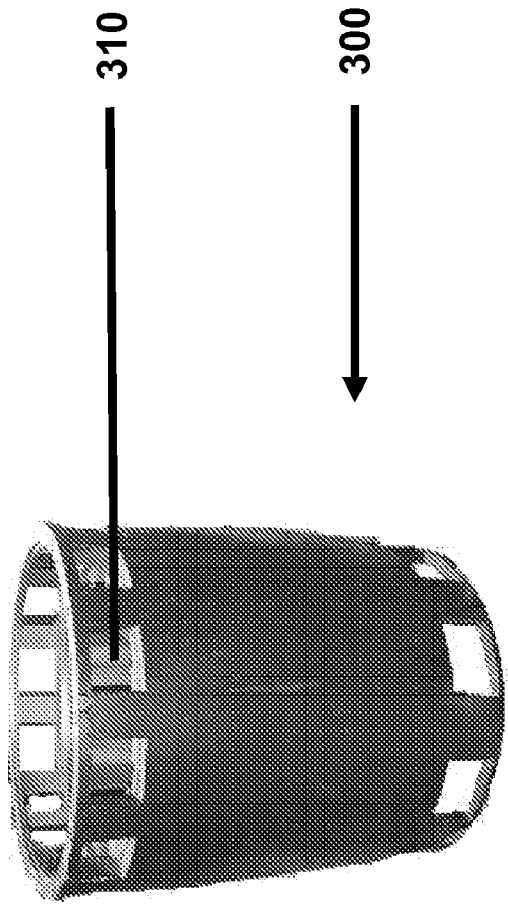
FIG. 3 is a view of a stator of the exemplary SR motor of FIG. 2.
Figure 11:
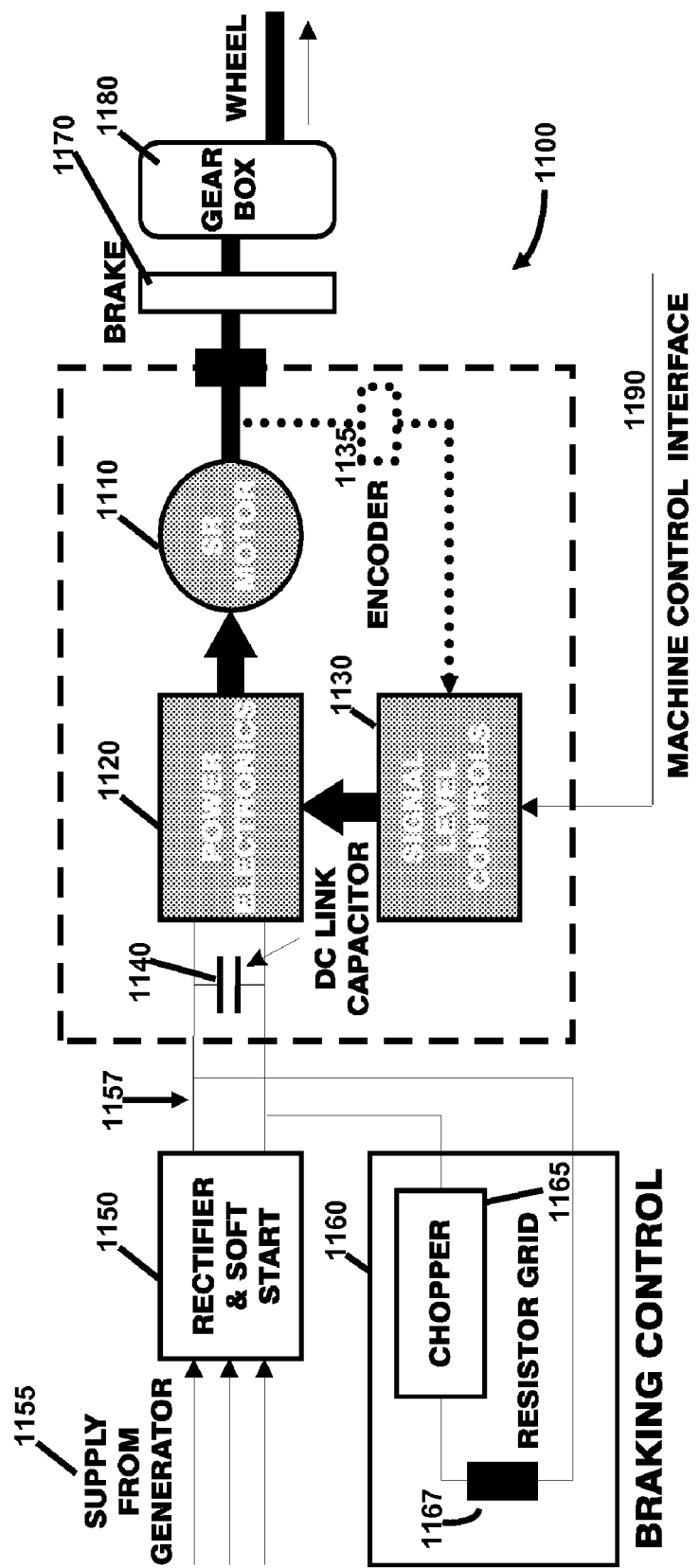
FIG. 11 is a block diagram of an exemplary SR motor system for a disclosed heavy-duty vehicle of an embodiment.

Turning now to FIG. 11, an SR motor system for driving a wheel of an embodiment of a heavy-duty vehicle adapted for an industrial environment is shown. As used herein, "industrial environments" includes applications of such a vehicle in the mining, earth-moving, forestry, construction, and transportation industries, but excludes consumer vehicles. Examples of such vehicles include loaders, wheel dozers, stackers, crash cranes, straddle hoist cranes, locomotives, and side porters. An SR motor system 1100 as shown in FIG. 11 includes an SR motor 1110, power electronics 1120, a DC link capacitor 1140, signal level controls 1130, as well as an interface 1190 to a control system. The SR motor 1110 may be a heavy duty three phase SR motor with 12 stator poles and eight rotor poles, as shown in FIGS. 2 and 3. The power electronics 1120 provides the switches and diodes 460 and 470 as described below to energize and deenergize the stator poles of the SR motor 1110, causing the rotor of the SR motor to rotate, driving the wheel of the heavy-duty vehicle. The use of the DC link capacitor is described below when describing the operation of a typical SR motor. Signal level controls 1130 provide circuitry for determining the rotational position of the rotor of the SR motor 1110 and generate appropriate gating signals to the power electronics 1120 switches. A sensorless technique for determining rotor rotational position may be used, avoiding the need for sensors for detecting such rotational position, which reduces maintenance issues caused by sensor failure. However, the SR motor 1110 may alternatively use sensors and/or an encoder 1135 (shown in dotted lines in FIG. 11) instead of a sensorless encoding technique. For electro-mechanical reasons, the power electronics 1120 may not switch full power to the stator poles immediately; thus, the signal level controls 1130 may time and control the signal levels such that stator pole windings of the SR motor 1110 receive a ramped power level, avoiding undesirable torqueing effects in the rotor of the SR motor 1110.

As shown in FIG. 11, the SR motor 1110 mechanically drives a wheel (not shown) of the heavy-duty vehicle through a mechanical brake 1170 and a gearbox 1180. The gearbox 1180 is typically a multiple-reduction type gear configured for the size and operating weight and speed characteristics of the heavy-duty vehicle, gearing down the output of the motor system 1100. In an exemplary embodiment, rotation of the SR motor 1110 is reversed to reverse the vehicle. In other embodiments, reversing may be accomplished by gearing or other mechanical linkage changes, without changing the rotation of the SR motor 1110. The mechanical brake 1170 is typically a disc brake.

A rectifier, typically a diode bridge rectifier, and soft start control 1150 rectifies AC voltage from a three phase AC generator supply 1155 to DC voltage for use with the SR motor 1110, creating a DC bus 1157. Although generally described herein using an AC generator, in some embodiments, other types of generators may be used, such as DC generators and SR generators. In embodiments in which generators are used that produce DC voltage, the rectifier 1150 may not be needed.

As shown in FIG. 11, a braking control 1160 allows shedding of excess energy of the SR motor during braking. When braking, the SR motor 1110 feeds back excess electrical energy, effectively becoming a generator. In one embodiment, this excess energy is converted to heat by a resistor grid 1167, dissipating the heat into the atmosphere.

A chopper circuit 1165 may turn on when an increase of DC bus 1157 voltage is detected. When the system goes into a braking mode, power may be regenerated to the DC bus 1157, causing an increase of DC bus 1157 voltage unless that energy is dumped. The chopper dumps that energy to the braking grids 1167, as shown in FIG. 11.

The machine control interface 1190 allows control of the SR motor system 1100 by a distributed control system, as described in more detail below.

The rectifier circuit 1150 and chopper circuit 1160 are described in more detail below.

Figure 20:
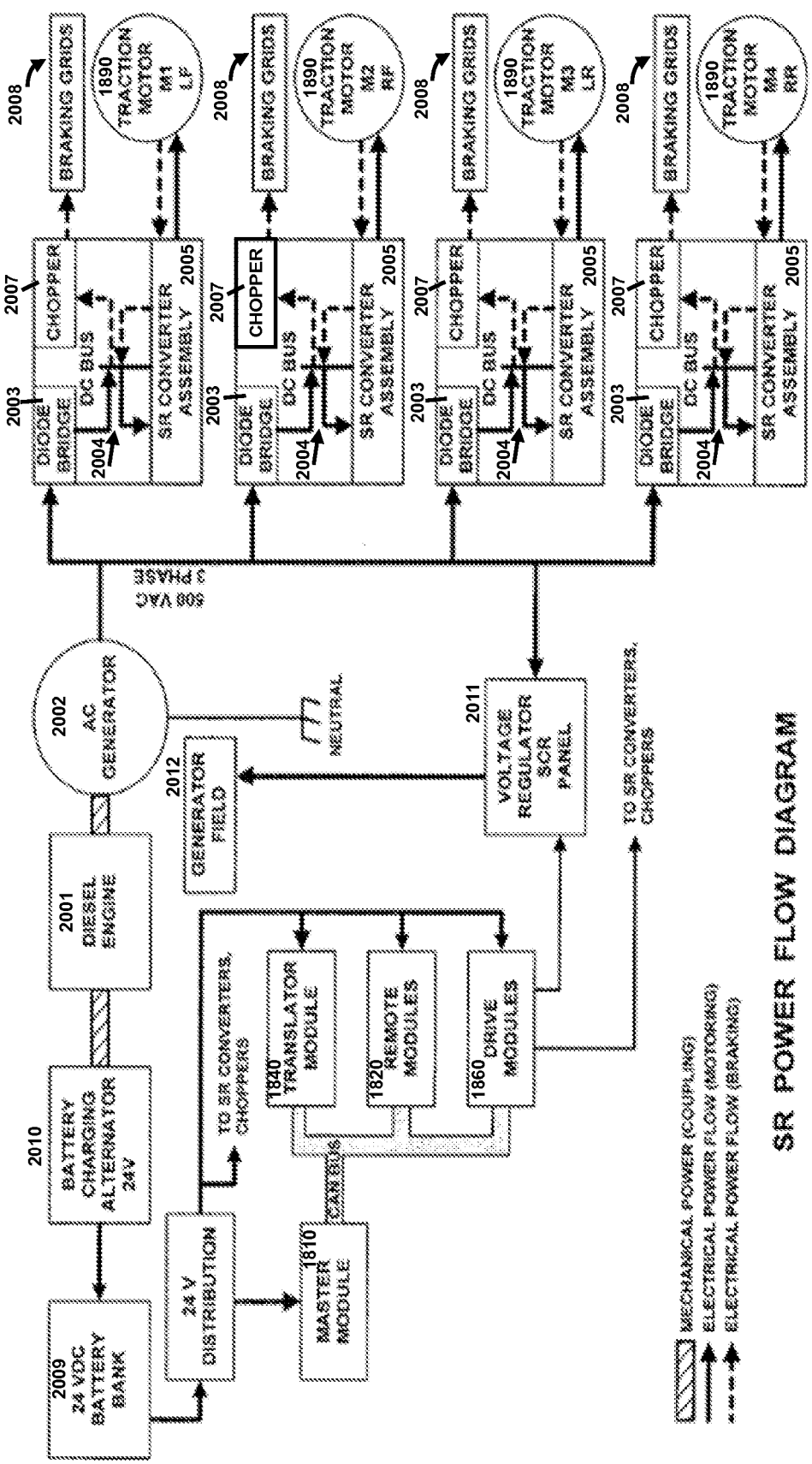
FIG. 20 is a block diagram illustrating SR power flow in an embodiment.

FIG. 20 illustrates the power flow in an embodiment of a heavy-duty vehicle using an SR motor system similar to the SR motor system 1100 illustrated in FIG. 11. An engine 2001, typically a diesel engine, mechanically drives an AC generator 2002. In FIG. 20, solid lines denote power flow from the generator 2002, through a diode bridge 2003, creating a DC bus 2004, and through an SR converter assembly 2005 to traction wheel motors 1890, corresponding to the SR motor 1110 of FIG. 11. Dotted lines denote the reversal of power flow from the wheel motors 1890, back through the SR converter 2005 to the DC bus 2004, and through a chopper 2007 to the respective braking grids 2008 when the vehicle goes into braking, corresponding to the braking control 1160 of FIG. 11.

The diesel engine 2001 is the prime power source, and is typically mechanically coupled directly to the AC generator 2002. A battery bank 2009 is typically four 12-volt lead-acid batteries connected in series/parallel to provide a 24-volt source for engine starting, generator priming, lighting, etc. Other batteries may be used. A separate alternator 2010, driven from the engine 2001, maintains the charge on the batteries 2009, as in an automotive system.

In an exemplary embodiment, an engine select switch in a cab of the vehicle controls engine speed. A high throttle position brings the engine speed to a predetermined operating speed, typically chosen based on engine characteristics to provide maximum engine efficiency and minimize environmental pollution. For example, in an L1350 loader from LeTourneau, Inc., the engine is typically run at 1980 RPM. With high throttle activated, battery power is fed through the voltage regulator 2011 to prime the field 2012 of the AC generator 2002.

As the AC voltage rises, the voltage regulator (VR) 2011 begins functioning and takes over the generator field regulation, controlling current in the field 2012 so that the generator voltages are maintained within specified limits during normal operating conditions.

The AC generator 2002 is typically a three-phase alternator with wye connected output windings, producing a main voltage. A nominal output of the AC generator 2002 may be 500 VAC at 66 Hz. Other generator types and output ratings may be used, as desired.

Figure 18:
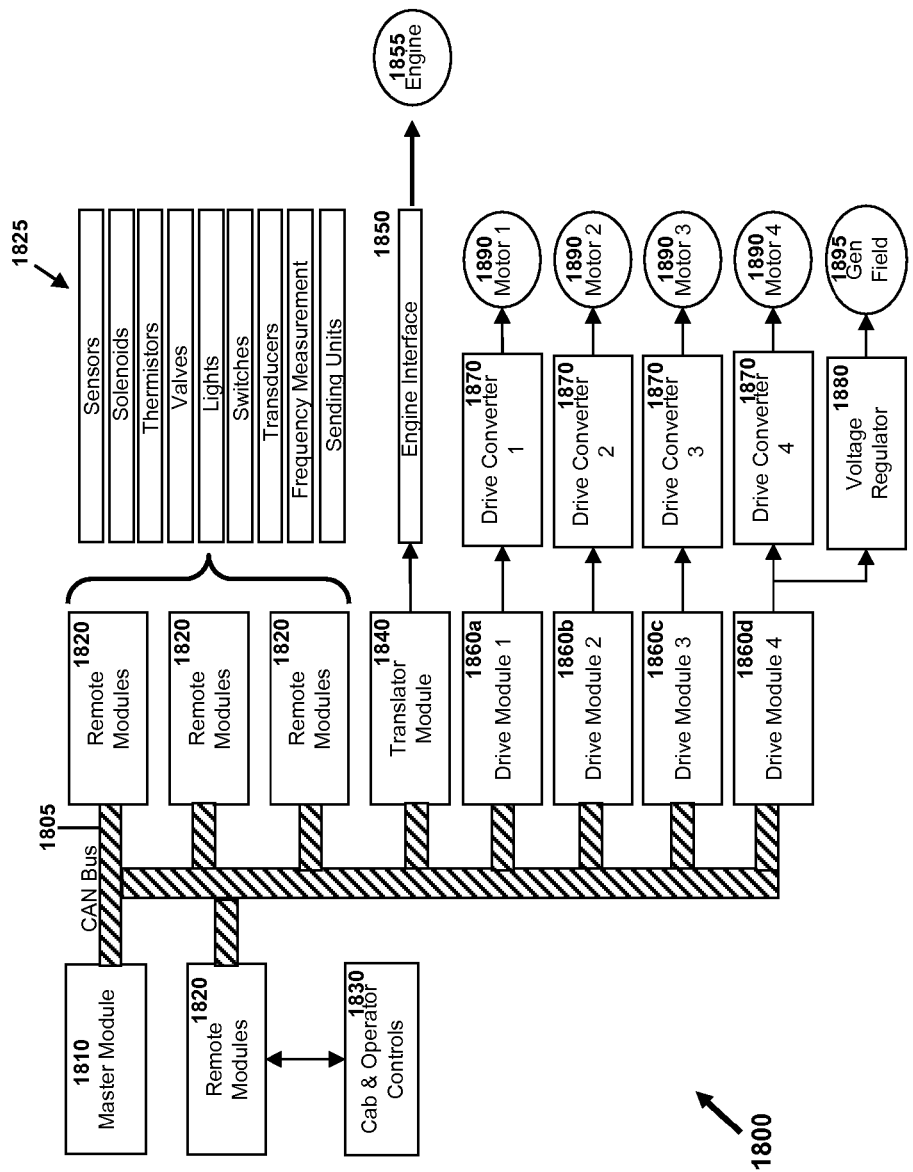
FIG. 18 is a block diagram illustrating a distributed control system for a heavy-duty materials handling system of an embodiment.
Figure 19:
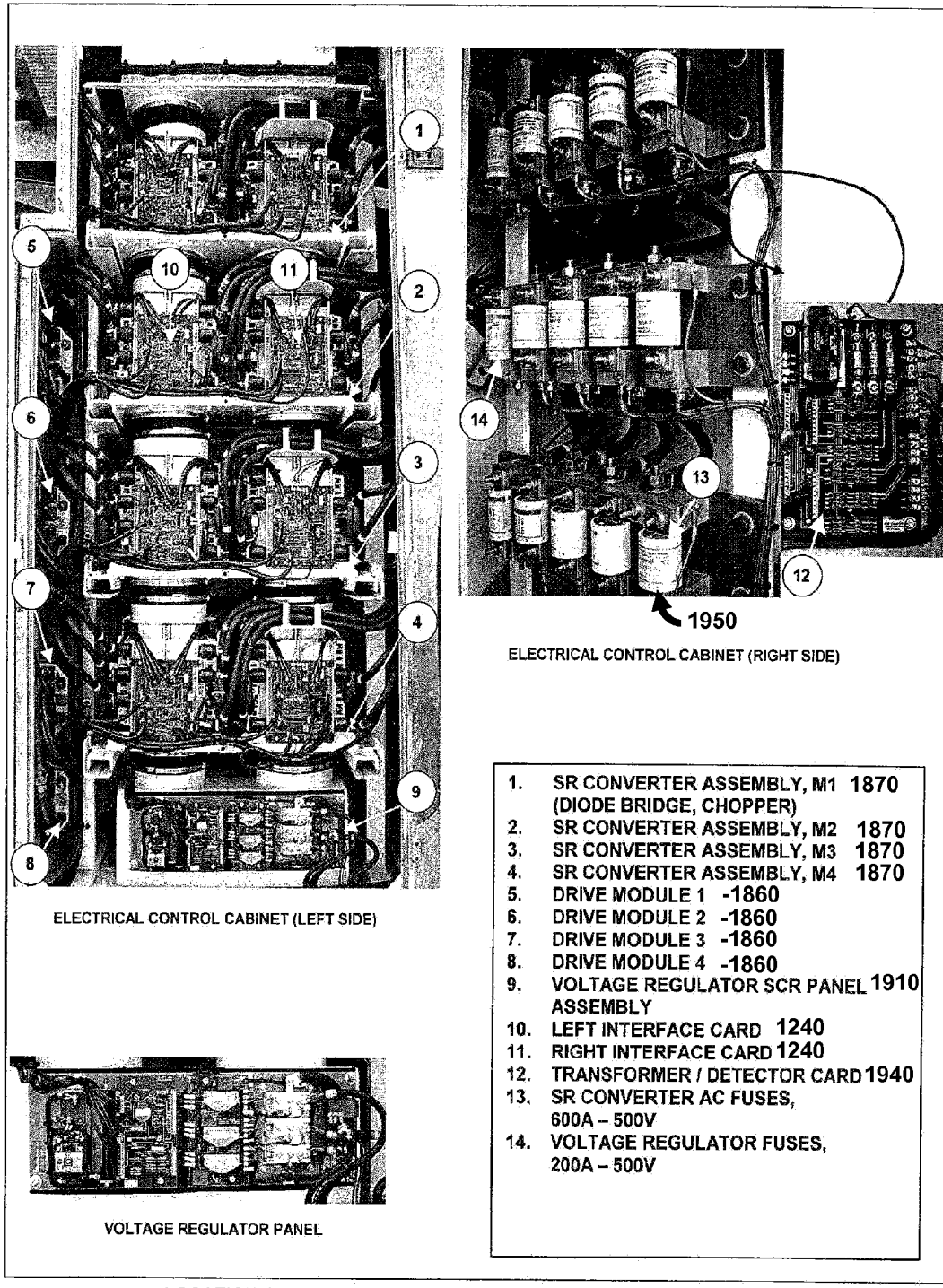
FIG. 19 is a photograph illustrating an electrical control cabinet for an embodiment of a heavy-duty materials handling system.

The main voltage is fed to a transformer/detector card 1940 located near the AC fuse assembly 1950 as illustrated in FIG. 19. This card may divide the high voltage signal across each fuse to control signal levels that are used for blown fuse detection. This card may also contain a three-phase transformer that reduces the main voltage to VAC signals used to detect the timing relationships of the three-phase system. Some embodiments use 28 VAC signals. These reduced VAC signals are sent to the drive modules 1860. In an embodiment illustrated in FIG. 18, drive module number 4 (1860d) is used to control the VR converter 1880, so these transformer signals are used there to set up the VR SCR firing. The voltage regulator 2011 regulates the generator field 2012 current to maintain a constant main voltage, regardless of the generator load.

The diode bridge 2003 puts power into the DC bus 2004 to establish a source for SR phase current. In motoring mode, power is taken from the bus 2004 to energize the respective phase stator poles to attract the rotor, and then to the next pole and so forth to provide a rotating attraction for the rotor to "chase," as described below in FIGS. 4-10. In the braking mode, the "rotation" of the stator poles "chases" the rotor to retard its rotation. This puts energy on the bus 2004 from the motors 1890, causing each motor 1890 to act as a generator. This will cause the bus voltage to increase. As the bus voltage increases, the chopper control turns on the chopper 2007, dumping the excess energy to the braking grids 2008, as described in more detail below.

The power flow of FIG. 20 is controlled by a distributed control system, using the machine interface 1190 of FIG. 11, as described below with respect to FIGS. 18 and 26.

Figure 1:
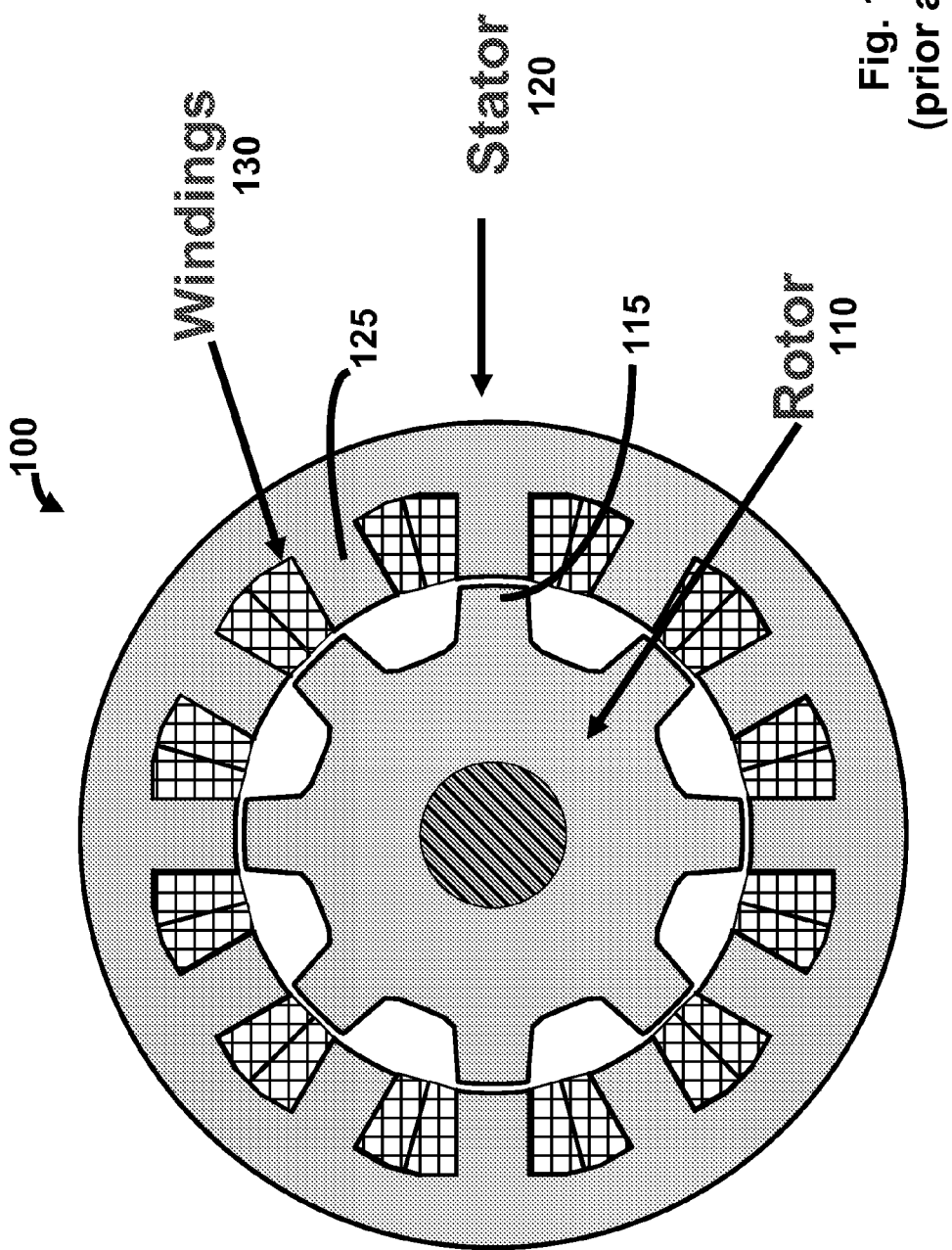
FIG. 1 is an end view illustrating an exemplary prior art switched reluctance (SR) motor.

A switched reluctance (SR) motor is a third type of electric motor, in addition to AC and DC motors. The SR motor utilizes electro-magnetic principles to produce torque on a rotor of the motor. As illustrated in FIG. 1, an SR motor 100 has a rotor 110 that has no magnets or windings of any kind and is effectively a stack of shaped, laminated iron pieces, creating an arrangement of poles 115. The SR motor 100 also has a stator 120, where the stator 120 has poles 125, each of which is magnetized by a coil or winding 130, similar to a field of a DC motor. As the stator pole winding 130 is energized, a magnetic force is generated and one of the rotor poles 115 will rotate into alignment with that stator pole 125.

In an SR motor, rotation is achieved with the sequential energizing of stator poles. This energizing creates magnetic field flux, which is a function of the current through the winding and the characteristics of the iron. The rotor will follow the sequencing, trying to align with energized stator pole. However, as alignment is almost achieved, that pole turns off as the next pole comes on. The SR motor makes rotation continuous by turning on the next pole before the previous one is turned off. This consecutive switching of the stator pole currents ensures the poles on the rotor are continually chasing the flux. The torque is achieved by creating flux, which is a function of the current through the winding and the characteristics of the iron. Although some SR motors use sensors to detect the position of the rotor, sensorless technology has been developed so the position of the rotor can be determined without external sensors, which can fail.

FIG. 2 is a drawing of a rotor 200 for an SR motor of an exemplary heavy-duty materials handling system. The middle section 210 of the rotor 200 is typically comprised of a stack of laminated cross-sections ("lams") for minimize eddy current losses. The number of lams in the rotor 200 is determined by the desired operating parameters for the SR motor, such as the horsepower of the motor. As shown in FIG. 2, the rotor 200 has eight poles 220.

FIG. 3 is a photograph of an exemplary stator 300 for use with the rotor 200 of FIG. 2. As shown in FIG. 3, the stator 300 has 12 poles 310, creating a three-phase SR motor. Winding coils, which in an operational stator 300 would surround each of the stator poles 310 are not shown in FIG. 3.

One skilled in the art will recognize that various numbers of rotor and stator poles can be used, depending on desired operating characteristics. In addition, the size of the SR motor, number of lams, size of lams, and other motor design characteristics vary depending on desired operational characteristics. Various companies can provide SR motor designs based on supplied desired SR motor characteristics. One such company is Switched Reluctance Drives Ltd. (SRDL) of Harrogate, United Kingdom.

FIGS. 4-10 illustrate the way in which successive energizing and deenergizing of the poles of an SR motor 400, such as the SR motors 1110 of FIG. 11, cause rotation of a rotor 420 of the SR motor 400. The schematics of FIGS. 4-10 are simplified for clarity of the drawing, and do not show, for example, control circuitry either for turning off and on switches 460a-460f, which in disclosed embodiments is provided by the distributed control system. As shown for clarity of the drawing in FIGS. 4-10, the SR motor 400, shown in cross section, has a stator 410, with six stator poles 440a-440f, and a rotor 420 with four rotor poles 430a-430d. Circuitry 450 provides electrical voltage to the windings (not shown) to energize the stator poles 440a-440f. The winding or coils for the stator poles 440 are wound in parallel such that two north and two south poles are created for each phase. Magnetic flux travels between poles, creating torque to align a stator 410 and rotor poles. Since the rotor poles have one section less than the stator 410, as one set lines up, another is in a position to be pulled toward the next energized stator pole coil.

As shown in FIGS. 4-10, the power circuits for each phase of the three-phase SR motor comprise two switches 460 and two diodes 470, one for each pair of stator poles 440a-440f, plus a capacitor 480, corresponding to the DC link capacitor 1140 of FIG. 11. Such circuits are well known in the art.

Figure 4:
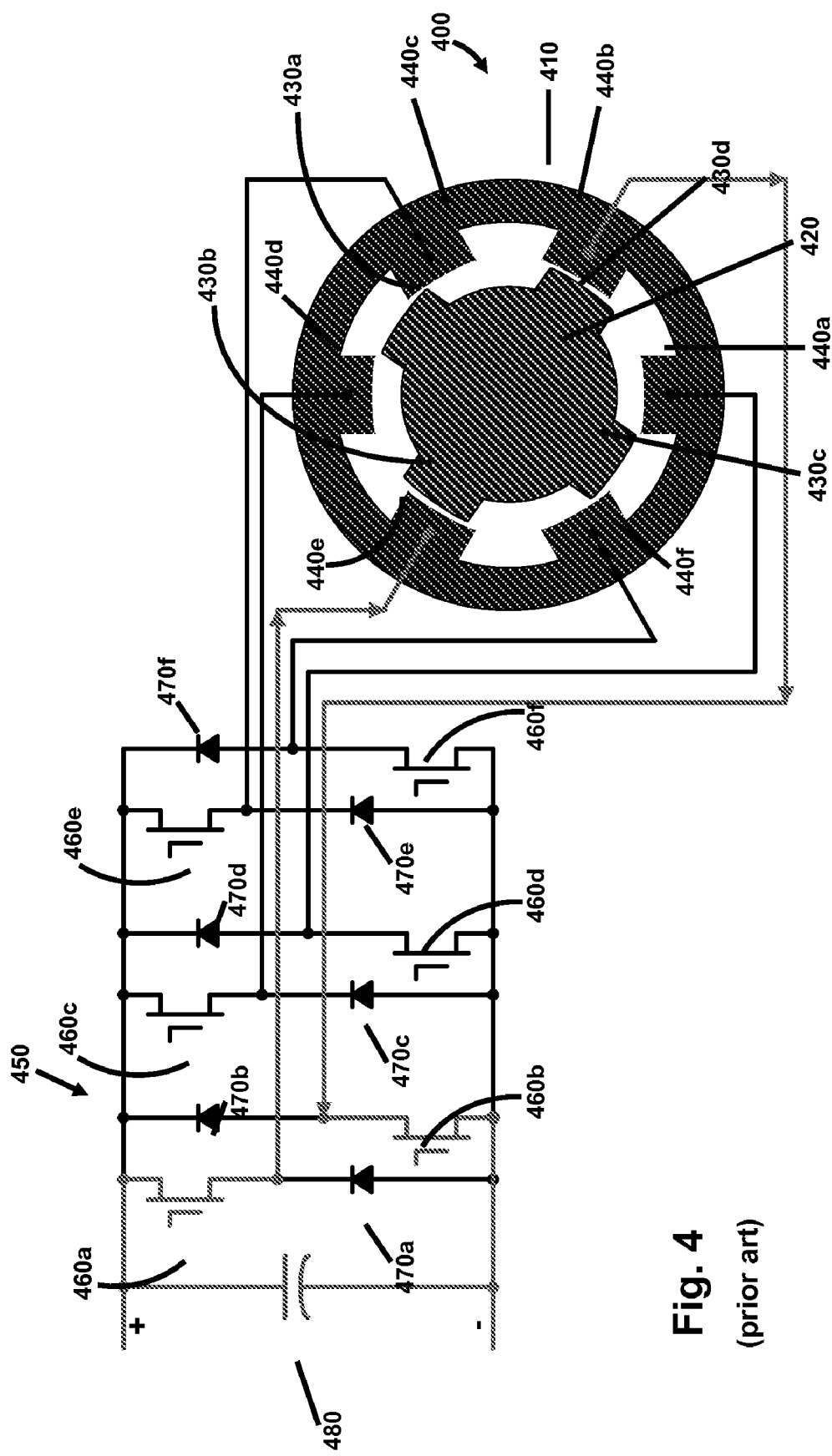
FIGS. 4-10 are schematics illustrating energizing and deenergizing poles in an exemplary prior art SR motor, causing the rotor to rotate.
Figure 5:
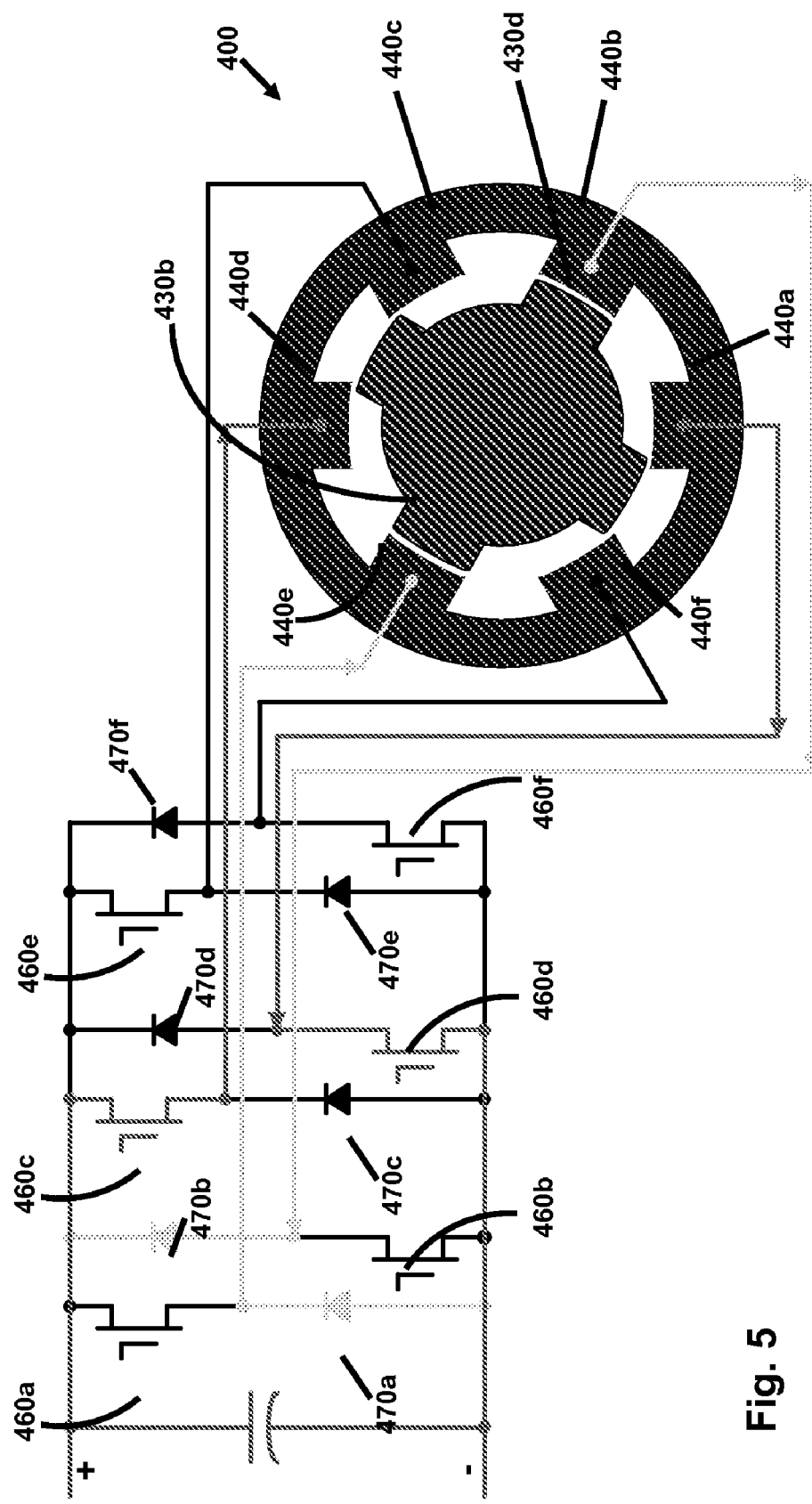

Turning to FIG. 4, one phase of the SR motor 400 begins by switching on switches 460a and 460b, allowing voltage to energize stator poles 440e and 440b. The other stator poles 440a, 440c, 440d, and 440f are deenergized. This causes the rotor 420 to rotate so that rotor poles 430b and 430d come into alignment with stator poles 440e and 440b. Then, as shown in FIG. 5, once rotor poles 430b and 430d align with stator poles 440b and 440e, the switches 460a and 460b are turned off, allowing energy to freewheel through the diodes 470a and 470b. The capacitor 480 can then store some of the electrical energy from the coils for later use. Use of the capacitor 480 serves as a storage and power factor correction device, decreasing the reactive power required from and thus the size of the AC generator 2002 needed for the heavy-duty vehicle, as compared to DC motor systems. Switches 460c and 460d are also turned on, energizing poles 440a and 440d, for a second phase of the SR motor 400.

Figure 6:
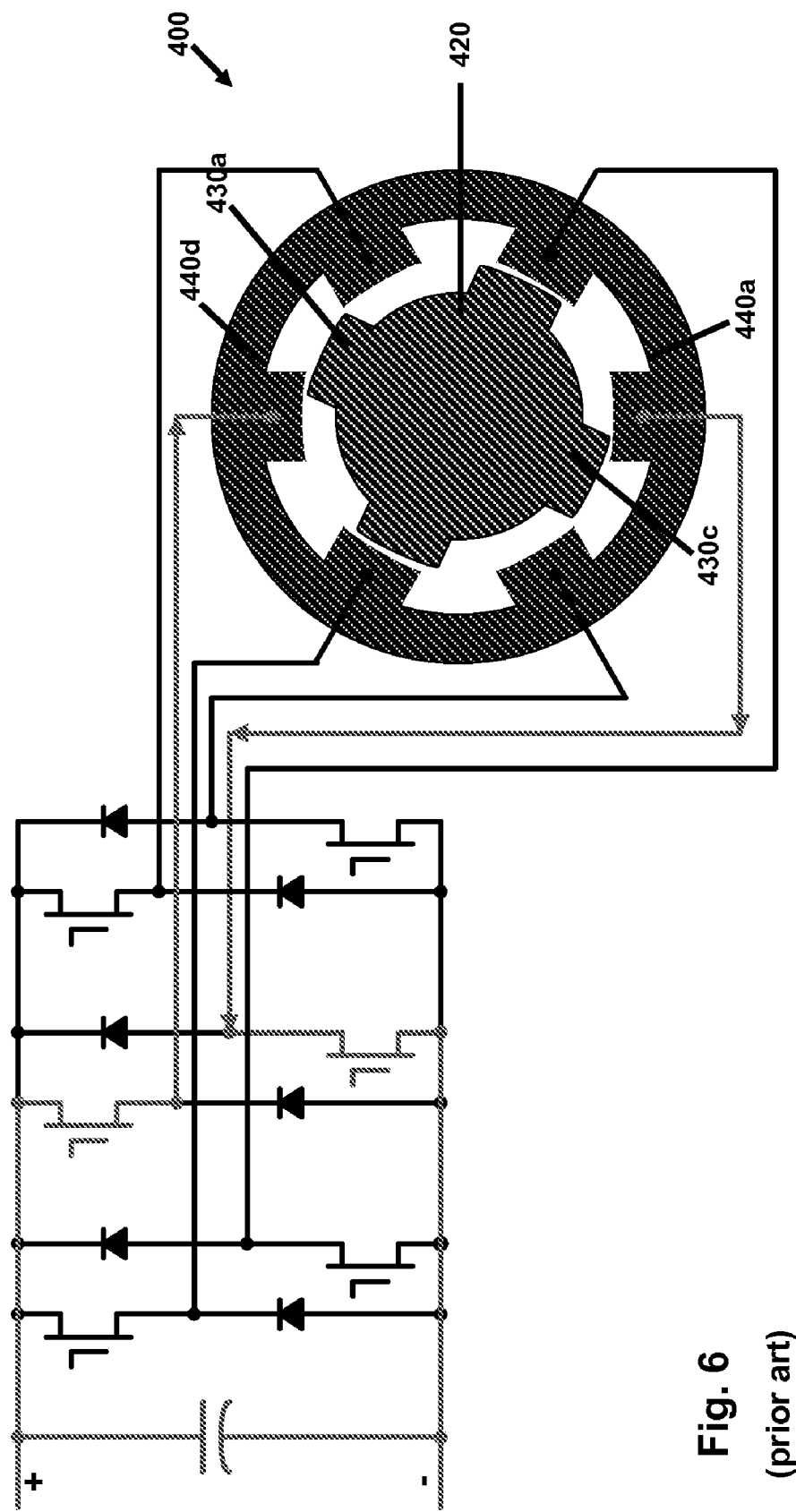
Figure 7:
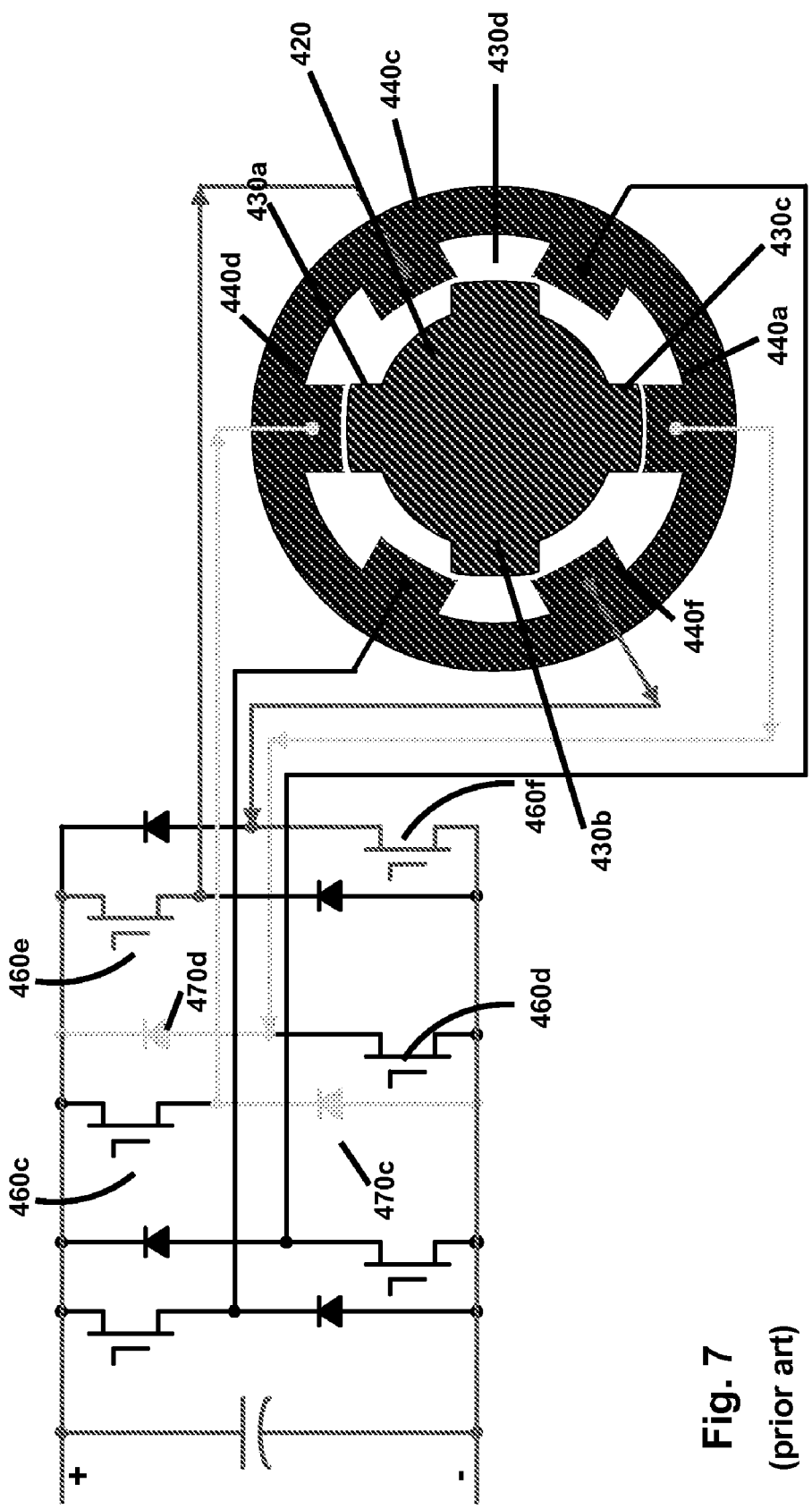
Figure 8:
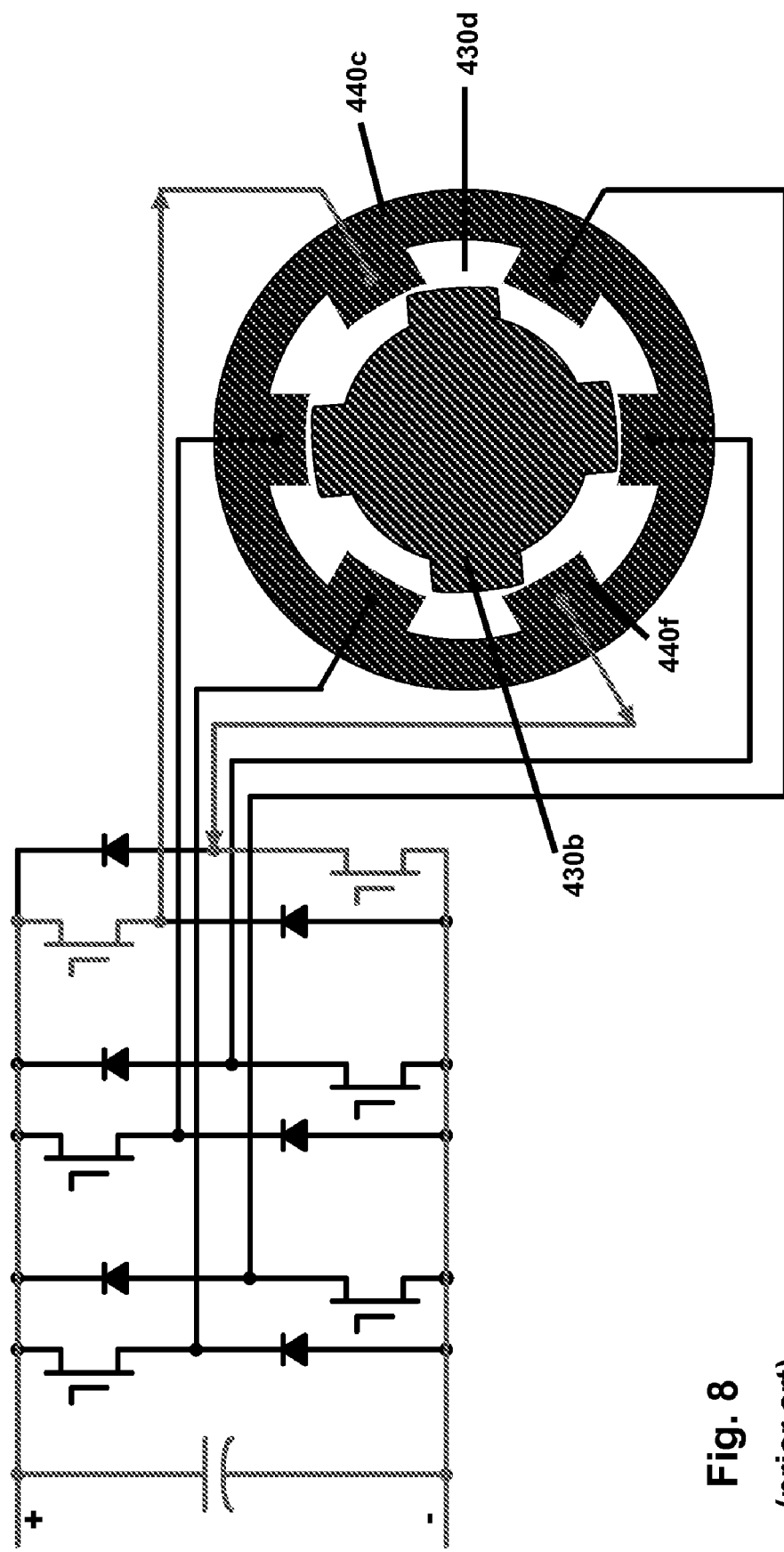

As illustrated in FIG. 6, the rotor 420 therefore rotates further, as rotor poles 430a and 430c begin to align with stator poles 440a and 440d. Then, as illustrated in FIG. 7, phase 2 finishes by switching off switches 460c and 460d when rotor poles 430a and 430c align with stator poles 440a and 440d, allowing coil energy to freewheel through diodes 470c and 470d. Stator poles 440c and 440f are also energized by switching current through switches 460e and 460f, beginning the third phase, causing the rotor 420 to rotate further, as rotor poles 430d and 430b are attracted to stator poles 440c and 440f, as shown in FIG. 8.

Figure 9:
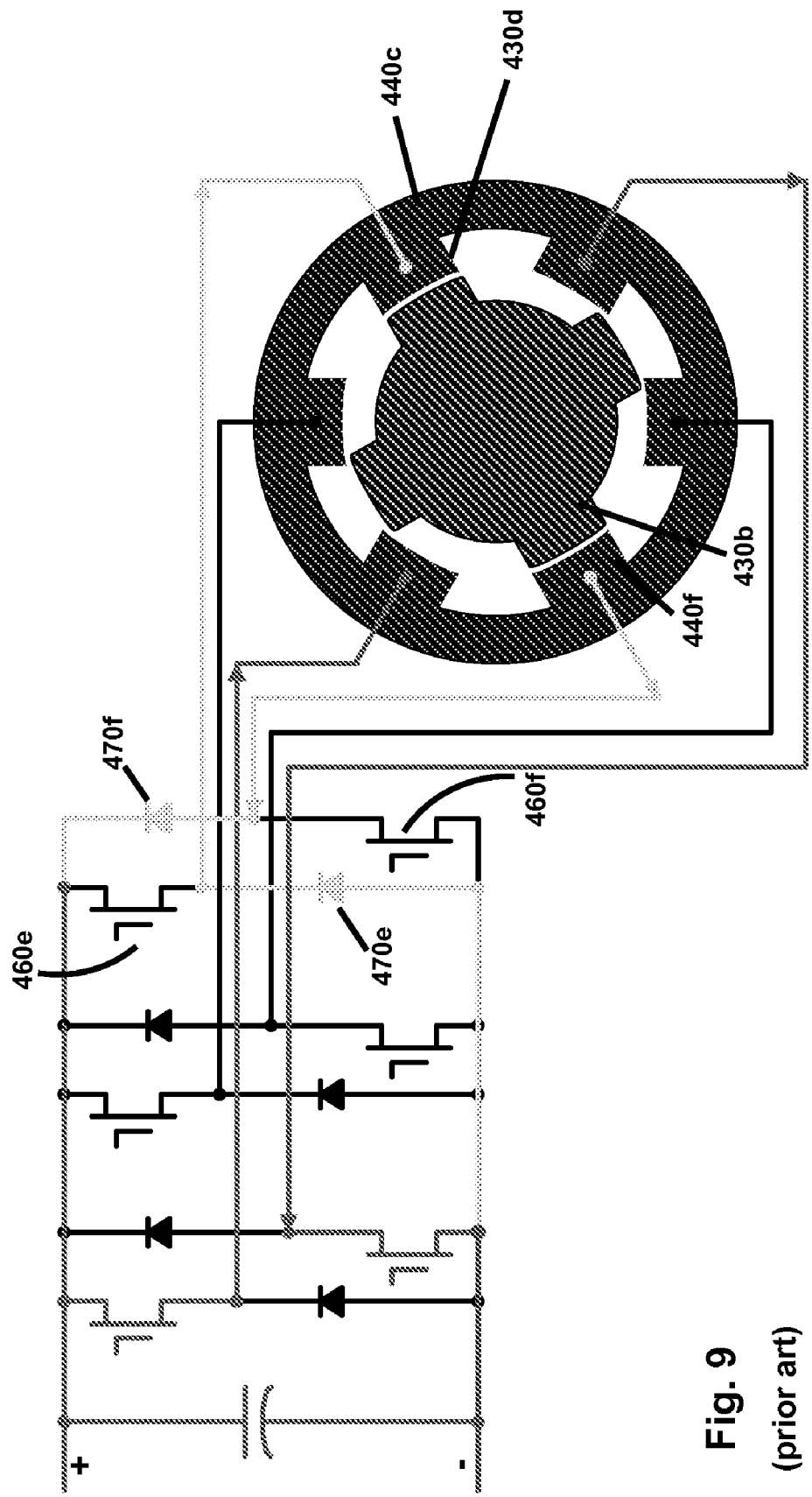
Figure 10:
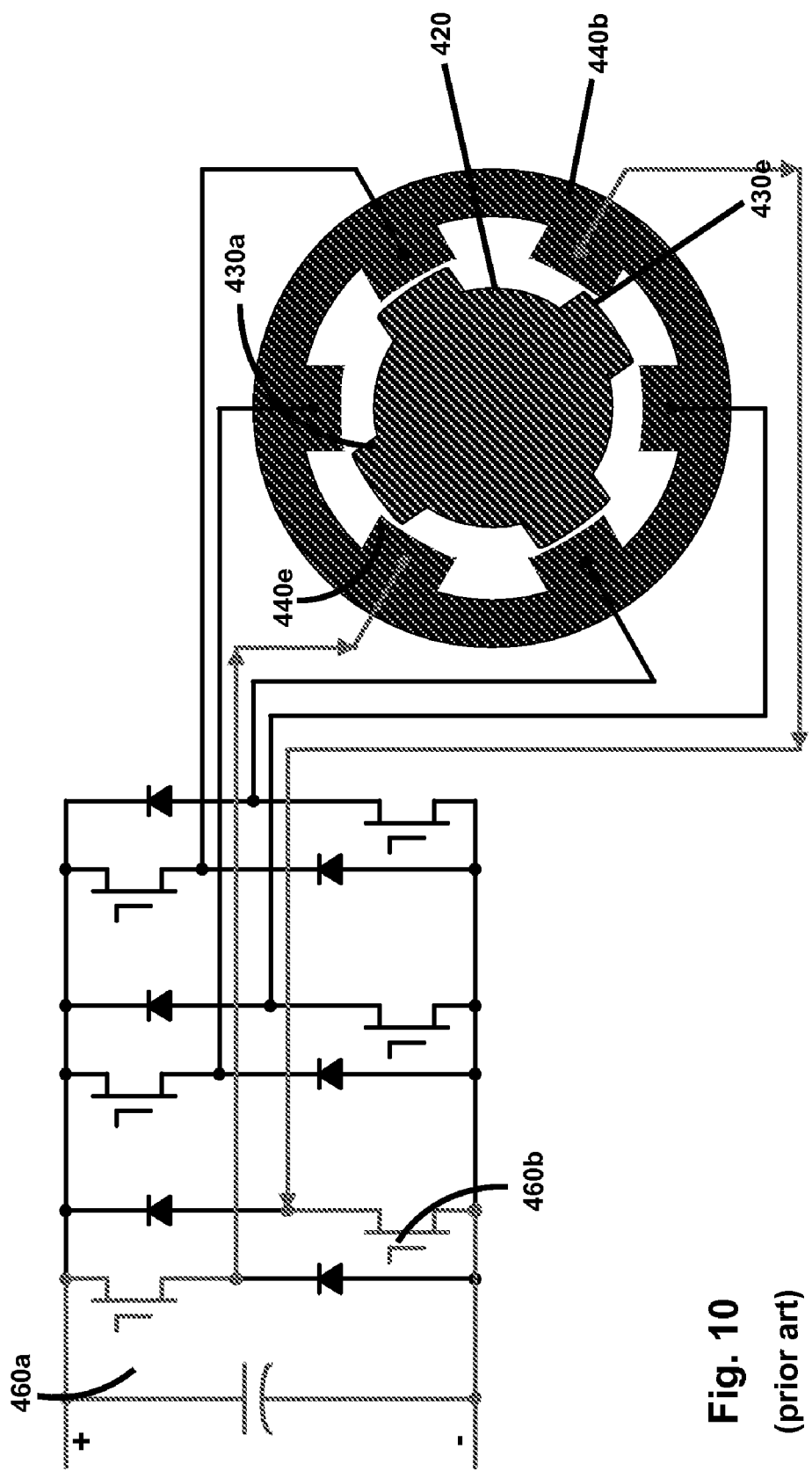

When rotor poles 430d and 430b align with stator poles 440, switches 460e and 460f turn off in FIG. 9, allowing coil energy to freewheel through diodes 470e and 470f, finishing phase three. Phase one then repeats in FIG. 10, switching on switches 460a and 460b, energizing stator poles 440b and 440e, this time causing rotor 420 to further rotate by attracting rotor poles 430a and 430c.

Although FIGS. 4-10 illustrate a 6 stator pole, 4 rotor pole, three-phase SR motor 400, one skilled in the art will recognize that other phase and pole numbers can be used. One disclosed embodiment uses a 12×8 arrangement, indicating twelve stator poles and eight rotor poles. The switches 460 of FIGS. 4-10 may be insulated gate bipolar transistors (IGBTs), gate turnoff transistors (GTOs), or other forms of switches known in the art. High current, high voltage IGBTs allow high speed switching with a small gate signal in a relatively small space, with desirable heating characteristics.

The use of switched reluctance technology in heavy-duty materials handling equipment, such as illustrated in FIGS. 11 and 20, has been made possible by today's high-power semiconductor switches and modern control techniques. One type of transistor switch that may be used to energize the stator coils is called the IGBT. IGBTs are now available in the current and voltage ratings needed for high horsepower applications such as heavy-duty materials handling equipment. The availability of these devices also paved the way for today's proliferation of AC drives. However, unlike AC drives, an SR drive has a stator pole coil in line with each IGBT. This system impedance gives more capability to control any type of system fault. Therefore, the "shoot-through" fault possible in AC systems is unlikely to occur, resulting in a much more robust drive. In addition, the generally lower switching frequencies in a SR motor system may result in a more efficient drive for heavy-duty materials handling equipment.

Figure 12A:
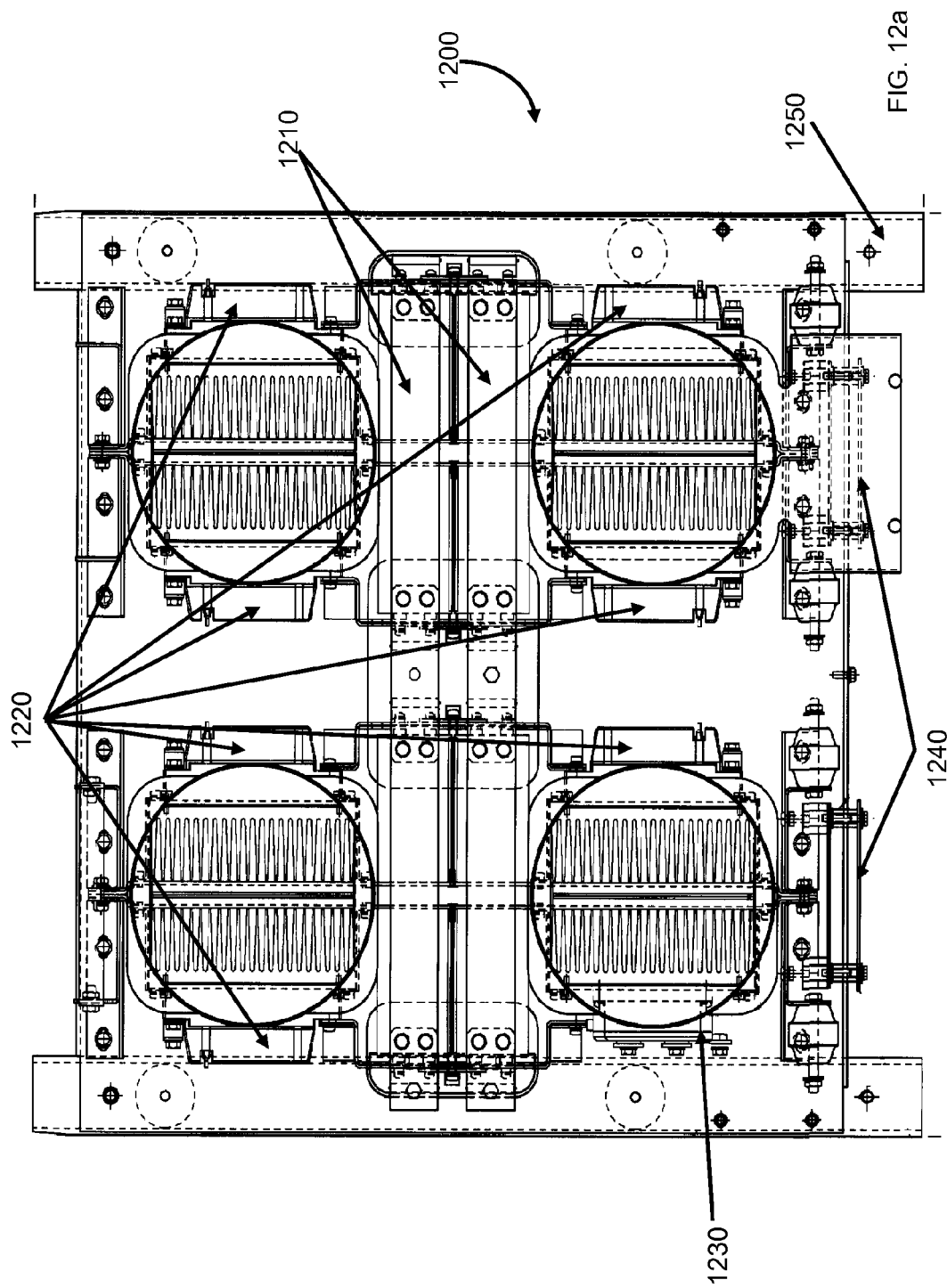
Figure 12C:
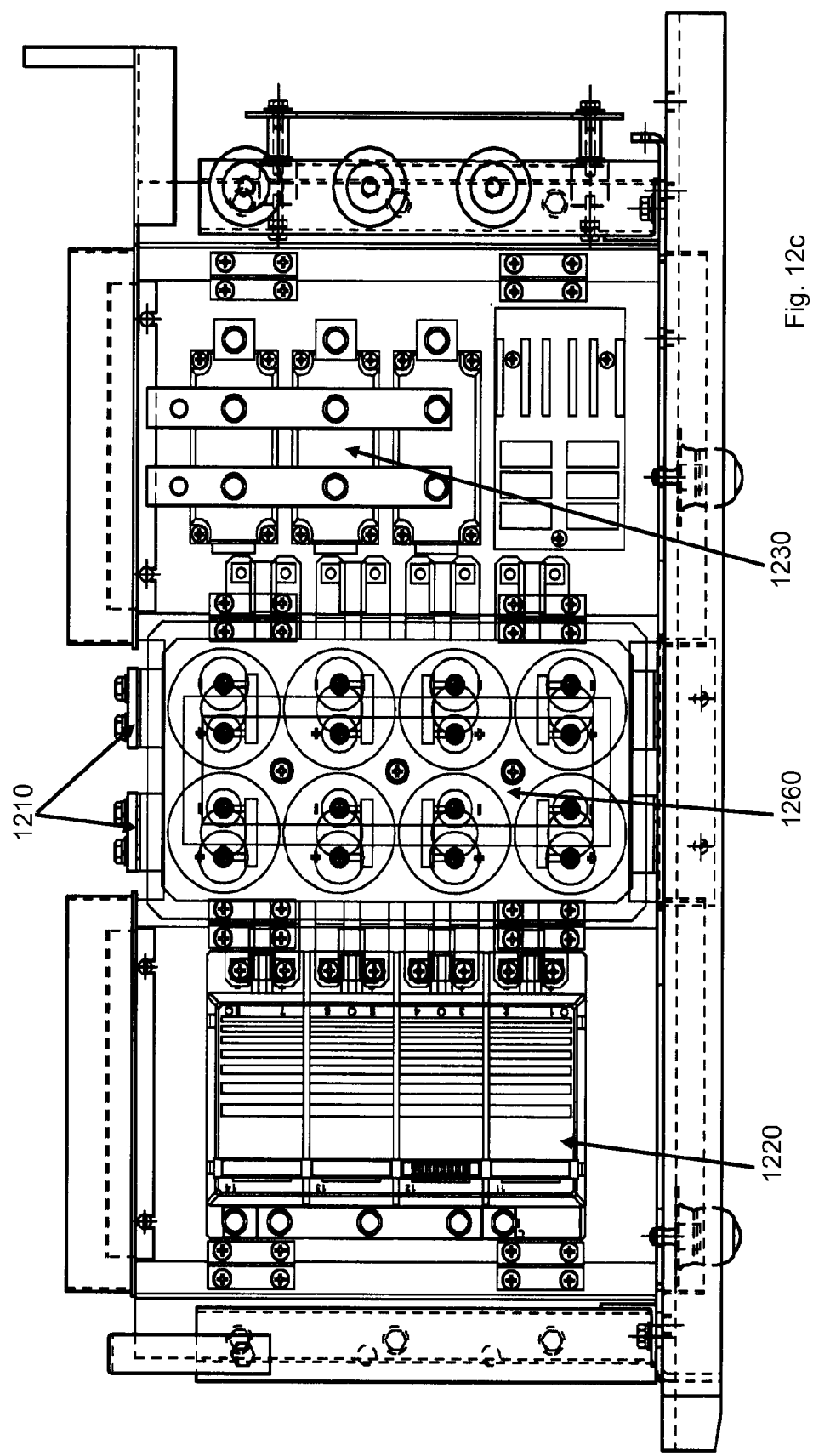
Figure 23A:
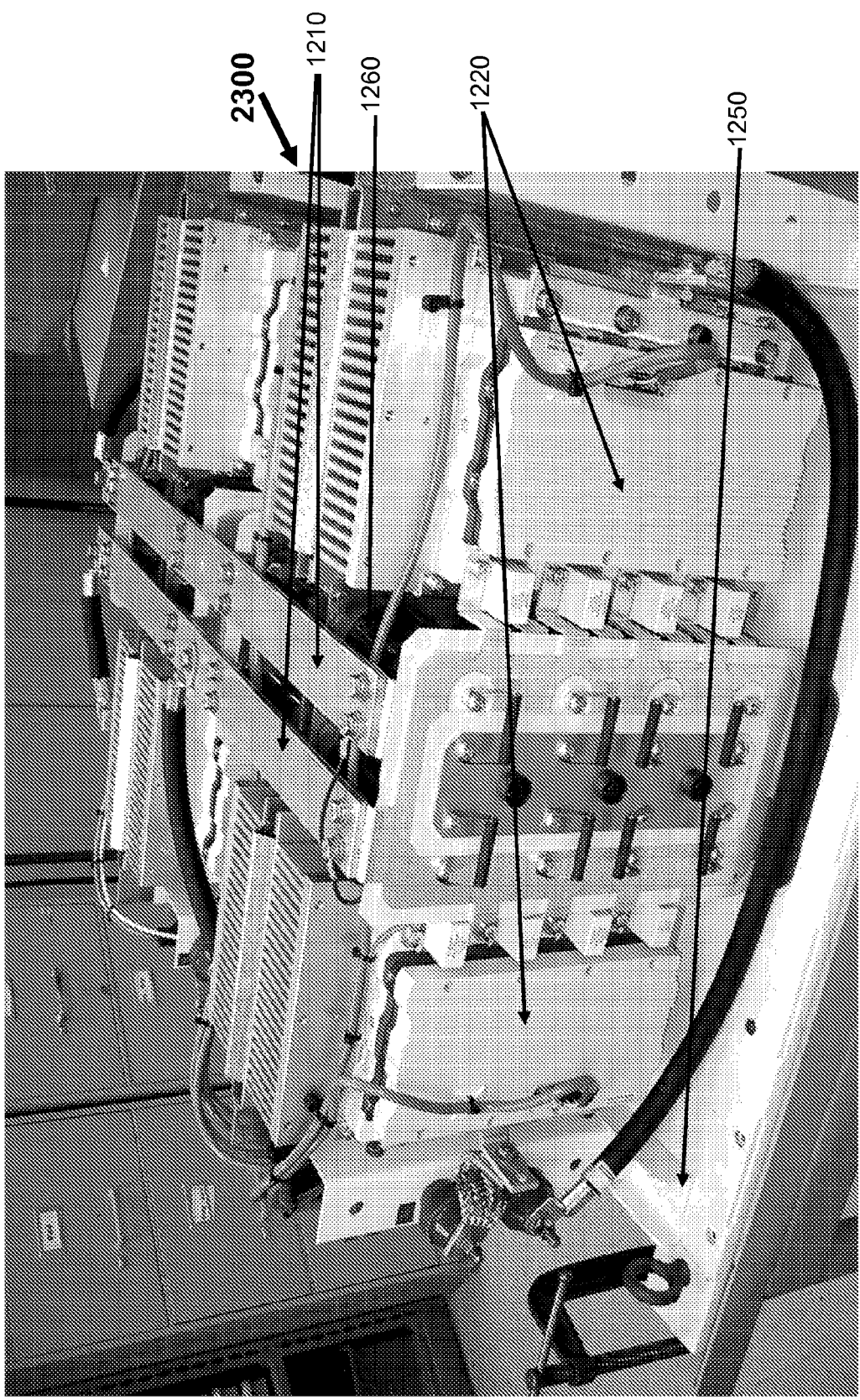

FIGS. 12a-12c illustrate three views of a physical layout of power converter module 1200 for one SR motor of an exemplary heavy-duty vehicle, corresponding to the power electronics 1120, rectifier 1150, and chopper 1160 of FIG. 11. FIGS. 23a-23b are photographs showing two additional views of the power converter module 1200, illustrating some of the wiring connections. The module 1200 includes three sections of the capacitor bank 480 and two IGBT and diode components 460a, 460b, 470a, 470b as indicated in FIG. 4, corresponding to each of the three phases of the SR motor, plus a similar section that has one IGBT for chopping and one diode bridge for rectification. In FIG. 12a, a top view of the module 1200 shows the DC bus 1210, corresponding to the DC bus 1157 of FIG. 11. Seven IGBTs 1220 are mounted as shown (six for the three phases of the SR motor, and one for chopping), as well as the diode bridge circuit 1230. A pair of interface boards 1240 provides connectivity to drive remote modules of a digital control system, as described below. The entire assembly may be mounted in a rack or tray 1250 for installation in the vehicle. Mounting the power converter module 1200 in a package on a tray, such as shown in FIGS. 23a-23b, simplifies manufacturing, installation, and maintenance of the converter electronics, which are typically very heavy.

FIG. 12b is a front view of the module 1200 of FIG. 12a. FIG. 12c is a side view of the module 1200 of FIG. 12a, viewing the module 1200 from a point of view of the left side of FIG. 12a. In this view, the banks of capacitors 1260, previously hidden by the DC bus bars 1210, can be seen.

FIG. 13 illustrates a disclosed embodiment of a converter cabinet 1300 containing power converter modules 1200 for four motors of an exemplary heavy-duty vehicle, in this case a loader. Other configurations and layouts of the power converter modules can be used as convenient.

The operator of a heavy-duty vehicle typically uses an operator interface to control the vehicle. In an exemplary embodiment shown in FIG. 14, an operator's cab 1400 provides an operator chair 1410.

Figure 14:
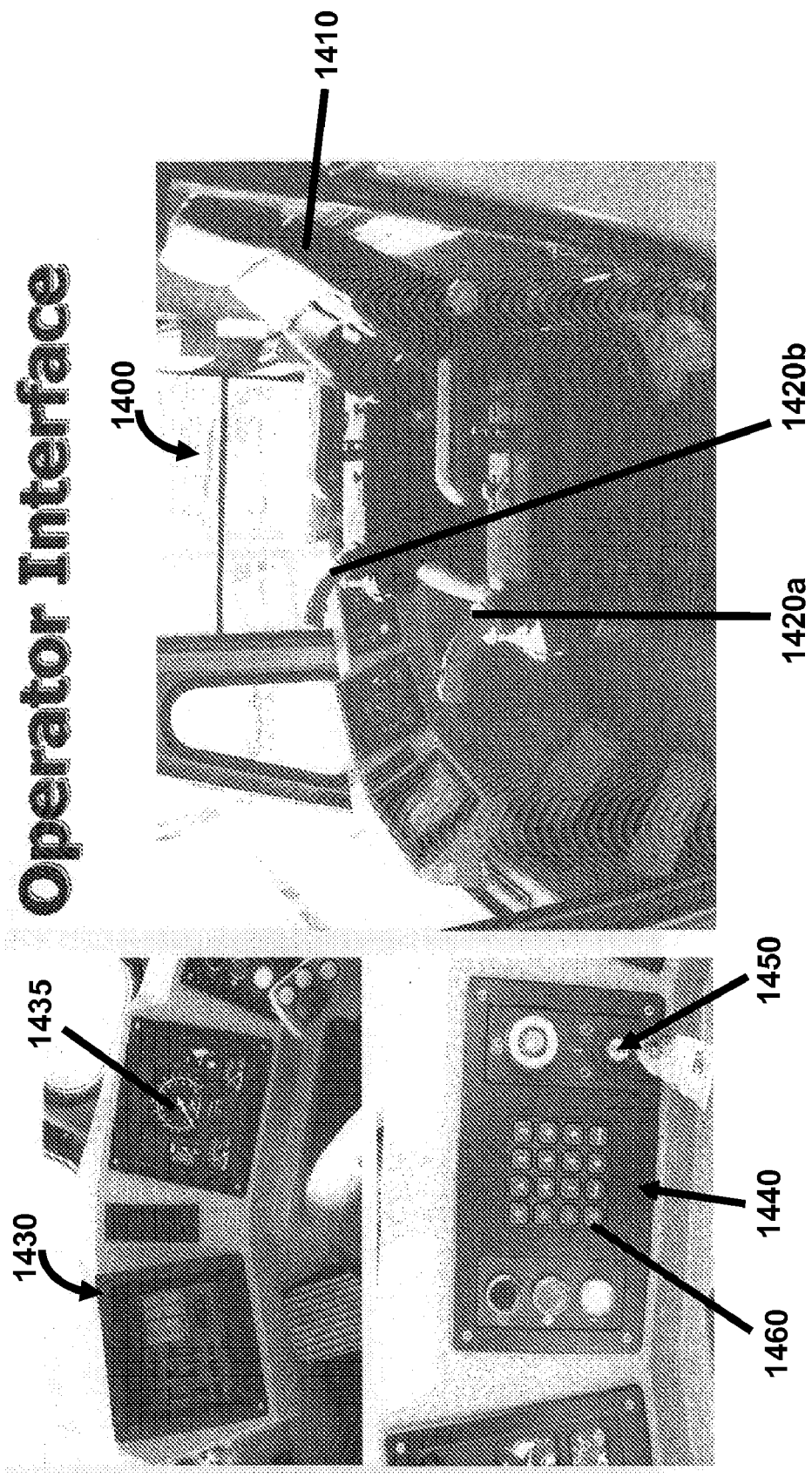
FIG. 14 is a photograph of an exemplary operator interface of a heavy-duty vehicle of an embodiment.

The illustrated embodiment of FIG. 14 is for a loader. Two joysticks 1420a and 1420b provide controls for signaling the vehicle to go forward, backward, etc., as well as control for movement of the bucket of the loader. Other operator controls may be used, such as levers, switches, foot pedals, steering wheels, etc. Operator displays 1430 provide visual feedback of vehicle operations to the operator. Panel 1435 displays normal gauge devices, such as a speedometer. The operator displays 1430 may also display maintenance information as desired. Multiple types of graphical, textual, and analog displays may be used as convenient. In addition, a control panel 1440 may provide a security key 1450 and a keypad 1460 for entering data, as well as indicator lights and audible alarms.

Figure 15:
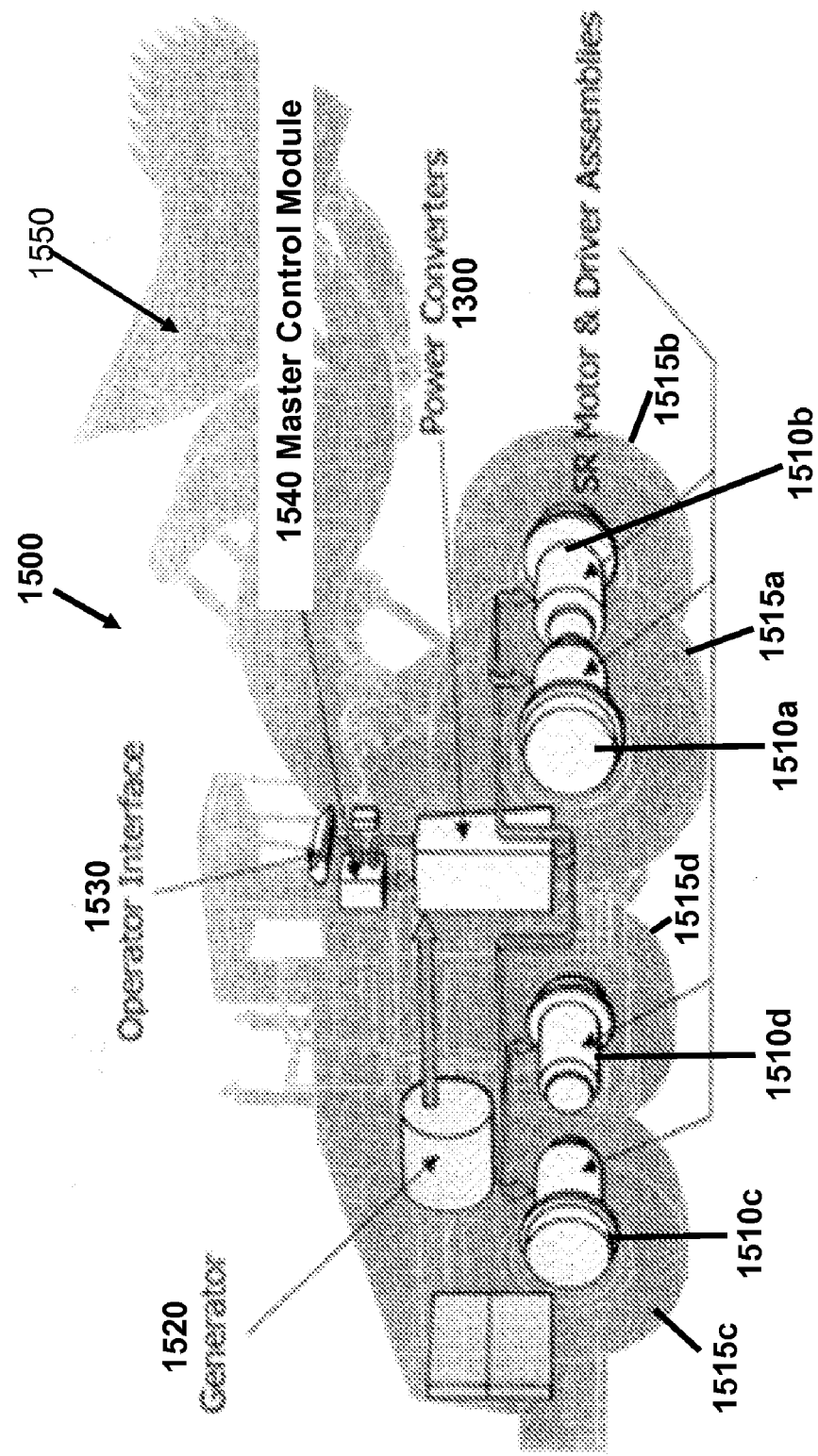
FIG. 15 is a view illustrating an exemplary SR motor traction drive system for an embodiment in a propelling mode.

Turning to FIG. 15, an illustration shows the use of four SR motor and drive assemblies in a loader 1500. Although shown in a loader, similar configurations may be used for other forms of heavy-duty mobile vehicles, such as wheel dozers, stackers, crash cranes, straddle hoist cranes, and side porters. As shown in FIG. 15, four SR motors/drivers 1510a-1510d separately drive wheels 1515a-1515d. However, a single SR motor assembly may be used to drive multiple wheels, as convenient. In such a multi-wheel, single motor configuration, a differential or other conventional technique for mechanically driving multiple wheels from a common drive source may be used. In some embodiments, some of the wheels may not be driven, e.g., two wheels may be driven and two wheels may be undriven. The power converter cabinet 1300, as shown in FIG. 13, provides the power conversion electronics 1120. A master control module 1540 (corresponding to the master control module 1810 of FIG. 18) controls the operator interface 1530, such as the operator interface 1400 of FIG. 14, as well as controlling the power converters 1300 and other electronics for the motors 1510a-1510d. As shown in FIG. 15, each wheel 1515a-1515d of the vehicle 1500 uses a rubber tire for traction with a surface, such as land, as with conventional heavy-duty vehicles.

FIG. 15 further illustrates the use of a materials handling system 1540, such as the bucket or scoop of the loader 1500. In some embodiments, the scoop is a hydraulically manipulated materials handling system, where hydraulic pressure is manipulated by mechanical linkages from the engine of the loader 1500. In other embodiments, the materials handling system hydraulics may be driven by another SR motor, similar to the SR motors 1510. In such embodiments, the digital control system described below may provide operational control of the materials handling system.

Figure 16:
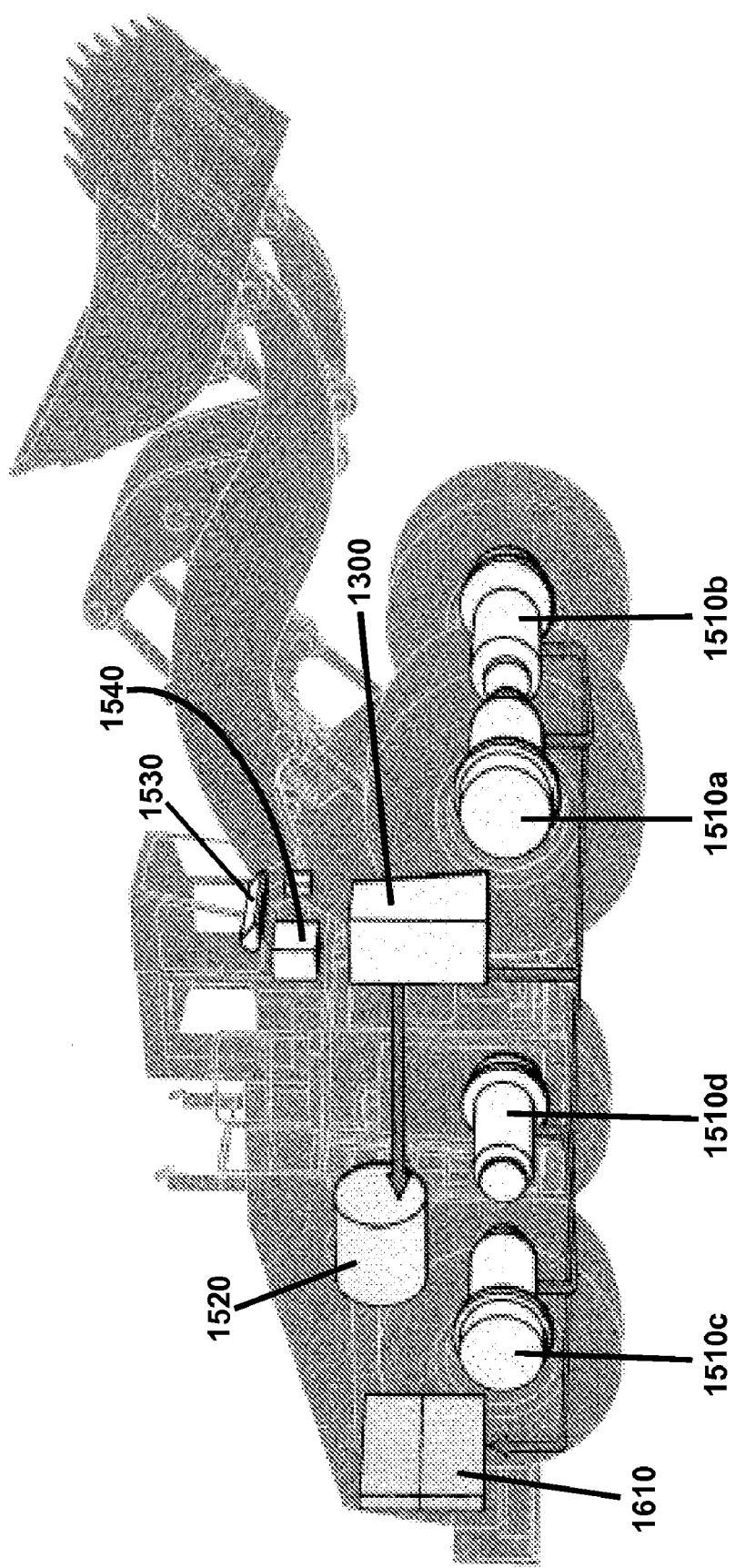
FIG. 16 is a view illustrating the SR motor traction drive system of FIG. 15 in a braking mode.

FIG. 16 illustrates power flow in the system 1500 when in braking mode, routing voltage to the generator 1520 and the braking grid 1610, as described above. Although typically the braking grid 1610 is an array of resistors, converting electrical energy into heat, other techniques may be used, as described below.

Propulsion power is typically required when the vehicle is operating on level or upwardly sloping surfaces. When operated on downwardly sloping surfaces, no propulsion power may be needed. Instead, the vehicle typically retards the downward progress of the vehicle. Friction brakes may not be suitable for this purpose, because they tend to wear out quickly due to the very large mass of the vehicle, especially when loaded. While friction or similar braking systems may provide the primary stopping system for such heavy-duty vehicles, many such vehicles employing DC wheel motors have used those motors to provide continuous retarding torque for traveling on a downward slope. By reversing the conventional DC motor field or armature current, a conventional DC motor may reverse torque direction and act as a DC generator, powered through the gearboxes of the vehicle wheels. Braking grids may be used to create a load, so that current generated by the DC motors is consumed by the resistors and dissipated as heat into the atmosphere. The amount of current consumed creates a corresponding load on the DC wheel motors, which is transmitted through the gearboxes to the drive wheels as retarding torque. However, an SR motor drive system 1100 does not depend on reversing a motor field or armature current, as in a conventional DC motor. The SR motor system embodiments disclosed herein use the braking control circuitry 1160 of FIG. 11 for such retarding purposes, as described below in more detail.

Figure 17:
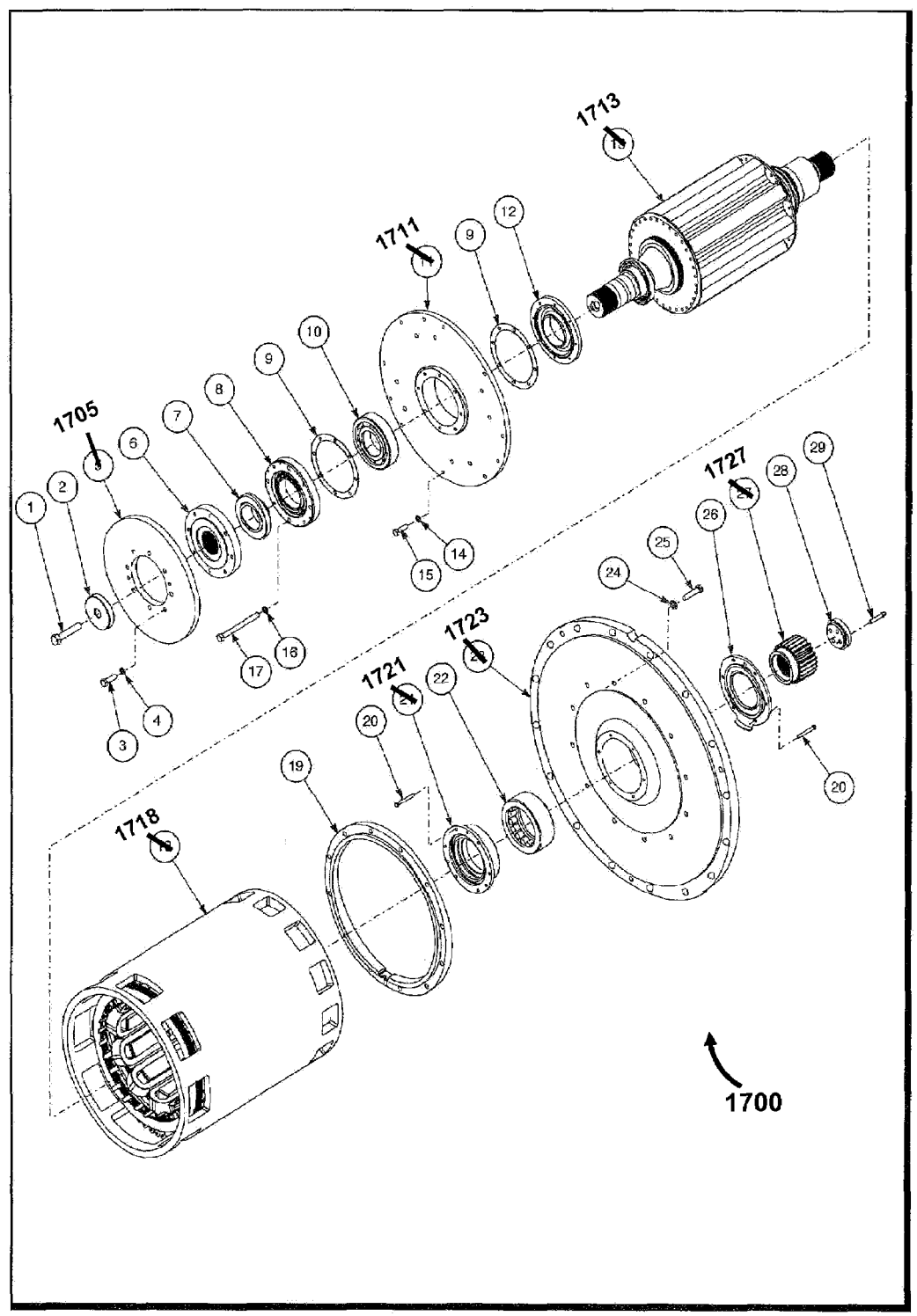
FIG. 17 is an exploded view illustrating an SR motor for disclosed heavy-duty vehicle of an embodiment.
Figure 21:
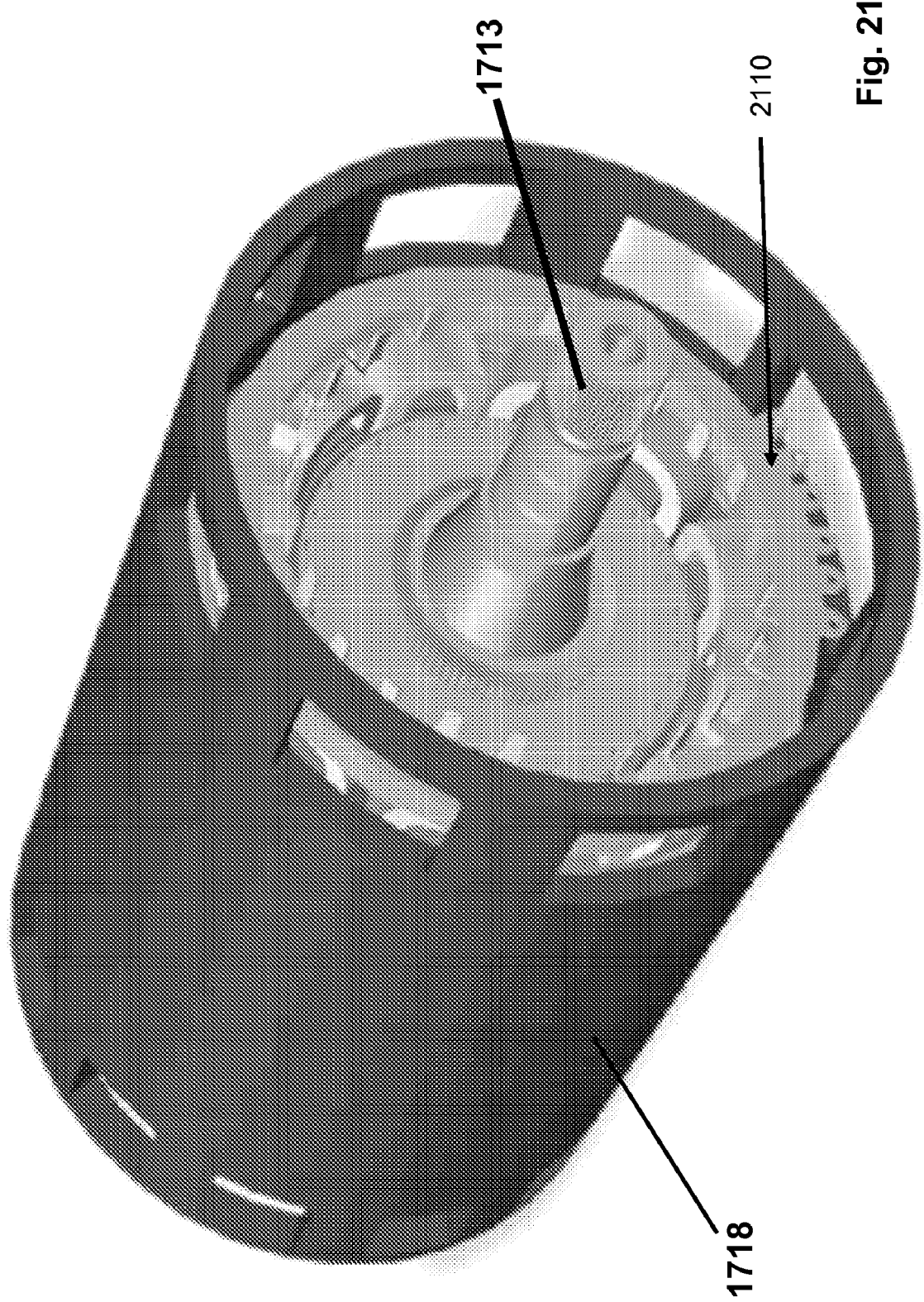
FIG. 21 is an end view exemplary SR motor and stator frame assembly of an embodiment.
Figure 22:
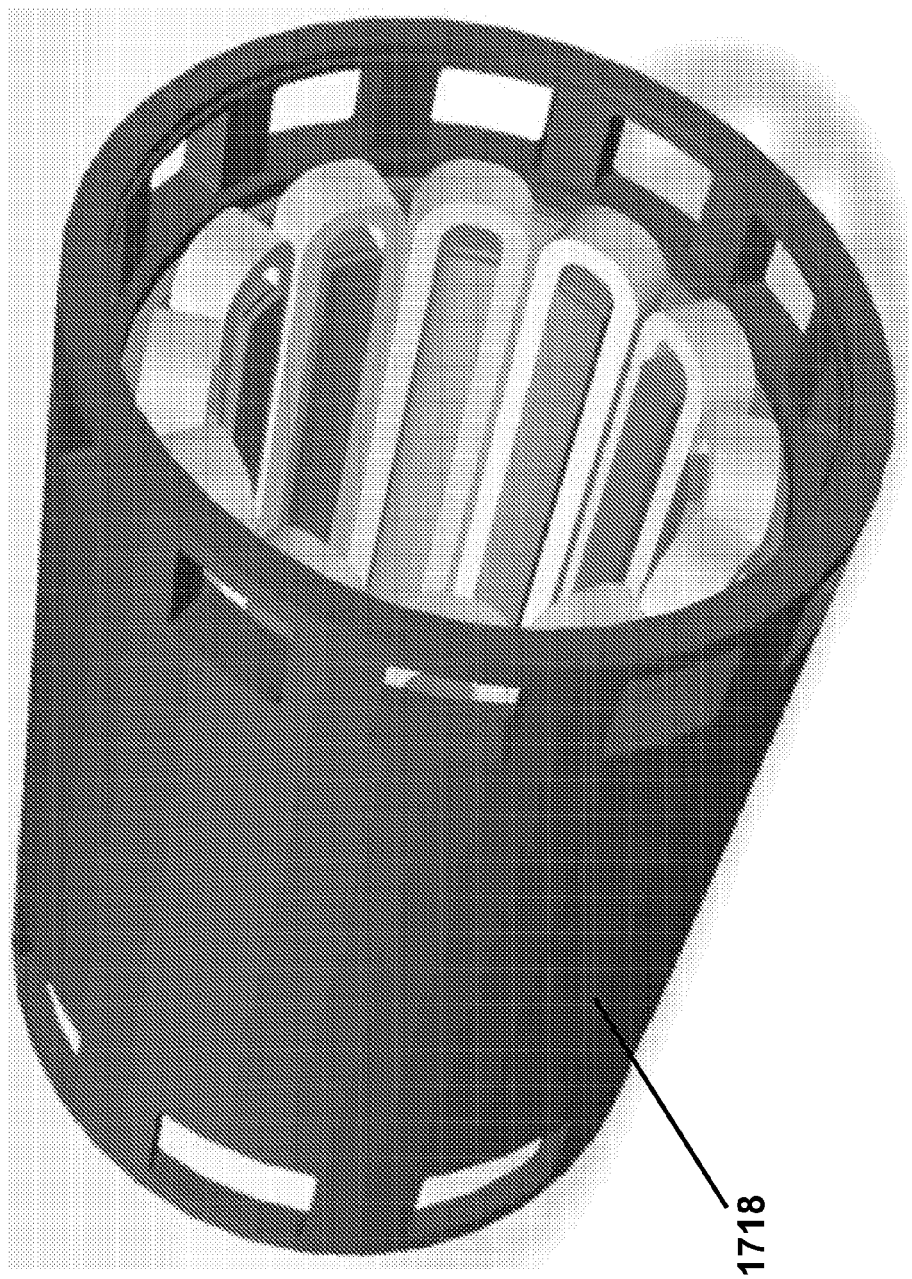
FIG. 22 is an end view of the other end of the SR motor rotor and frame assembly of FIG. 21.

FIG. 17 is an exploded view of an SR motor assembly 1700 of an exemplary embodiment, such as used in the embodiment illustrated in FIGS. 15-16. As shown, rotor 1713 is supported by and rotates on bearings that are connected to a first end piece, commonly known as an end bell, 1711, and a second end bell 1723. A brake disc 1705 is connected to the rotor 1713 for mechanical braking of the motor assembly 1700. Although electrical braking by the SR motor drive system 1100 typically provides the primary braking, the disc brake 1705 may be used for backup or stationary braking purposes. The rotor 1713 is placed in the stator assembly 1718, and connected to a shell pinion 1727, for driving a conventional gearbox (not shown) on the wheel driven by the motor assembly 1700. The end bells 1711 and 1723 are bolted to the stator assembly 1718. In one embodiment, a labyrinth seal 1721 provides an oil seal for lubrication, preventing lubrication from contaminating the interior of the motor assembly 1700. Other types of seals may be used. FIGS. 21 and 22 illustrate the rotor 1713 assembled with the stator 1718 from each end. Unlike FIG. 3, where the stator was shown without the coil windings, FIGS. 21 and 22 show the poles of the stator 1718 surrounded by the coil windings. FIG. 21 further shows a phase ring 2110, as describe in detail below.

Although not shown in detail in FIG. 17 for clarity of the drawing, coils winding around the various stator poles of the stator 1718 must be connected to the DC bus 1157 and power electronics 1120 as shown in FIG. 11. A phase ring, such as shown in an exploded view in FIGS. 27a-27c may be used to route wiring from the power electronics 1120 to the coil windings, which otherwise is difficult to do, because of the large size of the wires necessary for such large electrical motors. In some embodiments, stator 1718 provides sufficient room for direct wiring of the coil windings to the power electronics.

In one embodiment, the SR motor system 1100 is integrated with a distributed control system such as the LINCS™ network from LeTourneau, Inc., which provides a complete machine control and monitoring system. The distributed control system, such as the system 1800 of FIG. 18, may manage all loader systems including hydraulics, electrics, drive system, and engine. As described below, the distributed control system 1800 features multiple microprocessor-based modules distributed throughout the machine that communicate over a Controller Area Network (CAN) network. However, one skilled in the art will recognize that other network protocols may be used. A master module 1810 directs the entire system and is located in the cab of the loader. Remote modules 1820 are located throughout the machine, each placed near the systems they control, monitor and manage. A translator module 1840 provides an interface to the engine 2001 and is able to "talk" to all intelligent engines, sending engine speed commands and receiving engine data. In one embodiment, the translator module may contain J1587, J1939, RS422, and R5232 communication ports. The translator module 1840 translates all engine input and output data to make it compatible with protocol used by the remainder of the distributed control system. The drive modules control the SR converters and VR converter.

FIG. 18 is a block diagram illustrating basic logic of a distributed control system 1800 for controlling a heavy-duty vehicle. Distributed control systems are known in the art, and have been used on vehicles for some time. One example of a digital distributed system is the LINCS™ system of LeTourneau, Inc., the assignee of the present invention. Other industrial manufacturers, such as Caterpillar, Inc, provide alternate distributed control systems.

In an embodiment such as shown in FIG. 18, a master module 1810 is connected to a collection of remote modules 1820 via a CAN bus 1805 as defined by international standard ISO 11898, a copy of which international standard is incorporated in its entirety herein for all purposes. The CAN standard was pioneered in the automotive industry and is used in industrial equipment markets. A CAN network provides the flexibility to handle large quantities of input/output (I/O), using multiple micro-controllers throughout a machine containing a CAN network. CAN is based on a so-called broadcast communication mechanism, using a message-oriented transmission protocol, where messages are identified by a message identifier, unique within the network, but not defining stations and station addresses. Hence, CAN networks can perform distributed process synchronization transmitting data via the network without the need for receiving stations to know the producer of the data. Although CAN message frames are defined by the ISO 11898 standard, the content of the data of those messages is not, and can be defined by the implementor. In one embodiment, the messages sent via the CAN network can be encrypted.

The master module 1810 may combine a microprocessor, such as a Pentium-class microprocessor with other industrial hardware, providing I/O capability for controlling multiple remote modules 1820. In one embodiment, up to 36 remote modules may be controlled from a master module 1810.

Other embodiments may control differing numbers of remote modules 1820. The master module 1810 typically contains storage for software used by the master module 1810, as well as storage for software that is downloaded across the CAN bus 1805 to the remote modules 1820 and drive modules 1840. A real-time operating system (RTOS) typically controls the operation of the microprocessor of the master module. One skilled in the art will recognize that the master module 1810 can be constructed in numerous ways. For the industrial environment, the master module is typically ruggedized and protected from environmental contamination by an industrial housing.

The remote modules 1820 may contain a microcontroller or microprocessor, such as a 32-bit microcontroller, and numerous I/O points. Software for execution by the remote module 1820 may be downloaded from the master module 1810, providing a distributed processing system. The remote modules 1820 typically have ruggedized industrial housings for placing near the devices to be controlled. The master module 1810 and remote modules 1820 and software provide the machine interface 1190 shown in FIG. 11.

The remote modules 1820 can be used to control various components 1825, such as sensors, solenoids, thermostats, valves, lights, switches, transducers, frequency measurement units, and sending units. Other remote modules 1820 can control cab and operator controls 1830, such as shown in FIG. 14. For example, a fuel gauge in the cab may be controlled by one remote module 1820, with a sending unit in the diesel fuel tank generating fuel level data to a second remote module 1820, with no direct wiring between the fuel gauge and the fuel tank. A translator module 1850 can be used to translate between the messages used routinely by the distributed control system 1800 and another message format used by other units, such as an engine interface 1850 for an intelligent engine 1855 manufactured by another vendor. While remote modules 1820 are generally fungible, specialized remote modules, indicated as drive modules 1860 in FIG. 18, may provide additional functionality for controlling drive converter logics 1870 that control the motors 1890 that drive the wheels of the heavy-duty vehicle. One drive module 1860 may also control a voltage regulator 1880 coupled to the generator field 1895 of an AC generator. Other distributed control systems may be used. Although as described above, the distributed control system is a digital system, an analog control system may be used.

FIG. 19 shows one embodiment of a solid-state conversion system. The electrical control cabinet 1300 of FIG. 13 is shown in greater detail in FIG. 19, showing an exemplary physical layout of drive modules 1860, drive converter modules 1200, a voltage regulator silicon controlled rectifier (SCR) assembly 1910, and interface cards 1240. One skilled in the art will recognize that other physical layouts may be used.

Figure 24A:
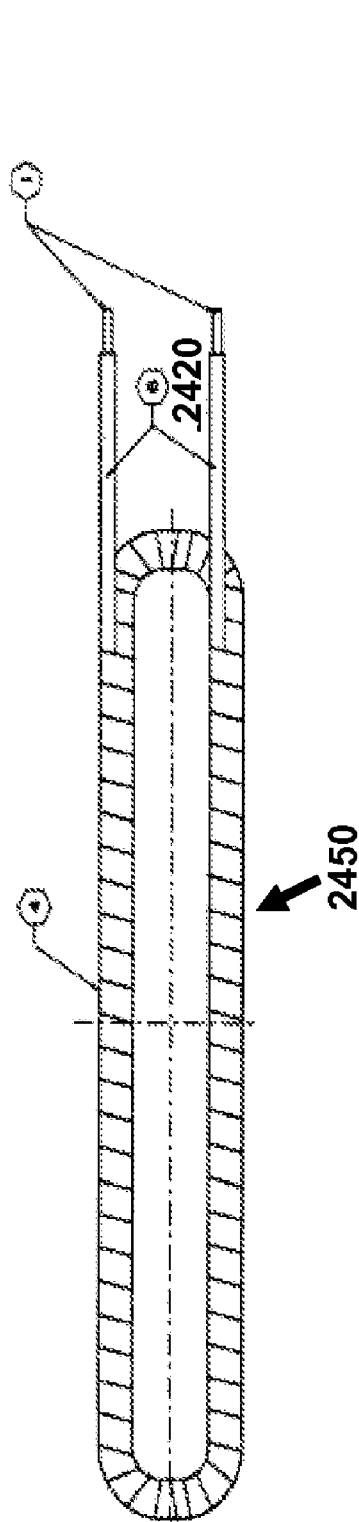
FIG. 24a is a view of an exemplary winding coil wrapped for an SR motor of an embodiment.
Figure 24B:
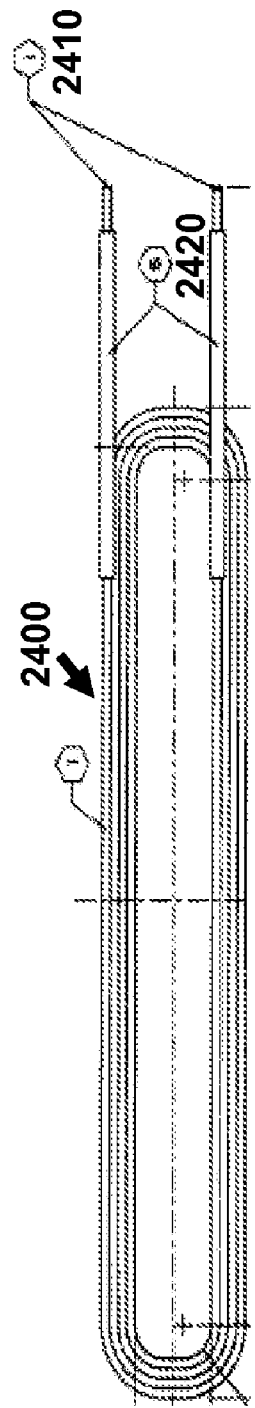
FIG. 24b is a view of the coil of FIG. 24a prior to wrapping.
Figure 24C:
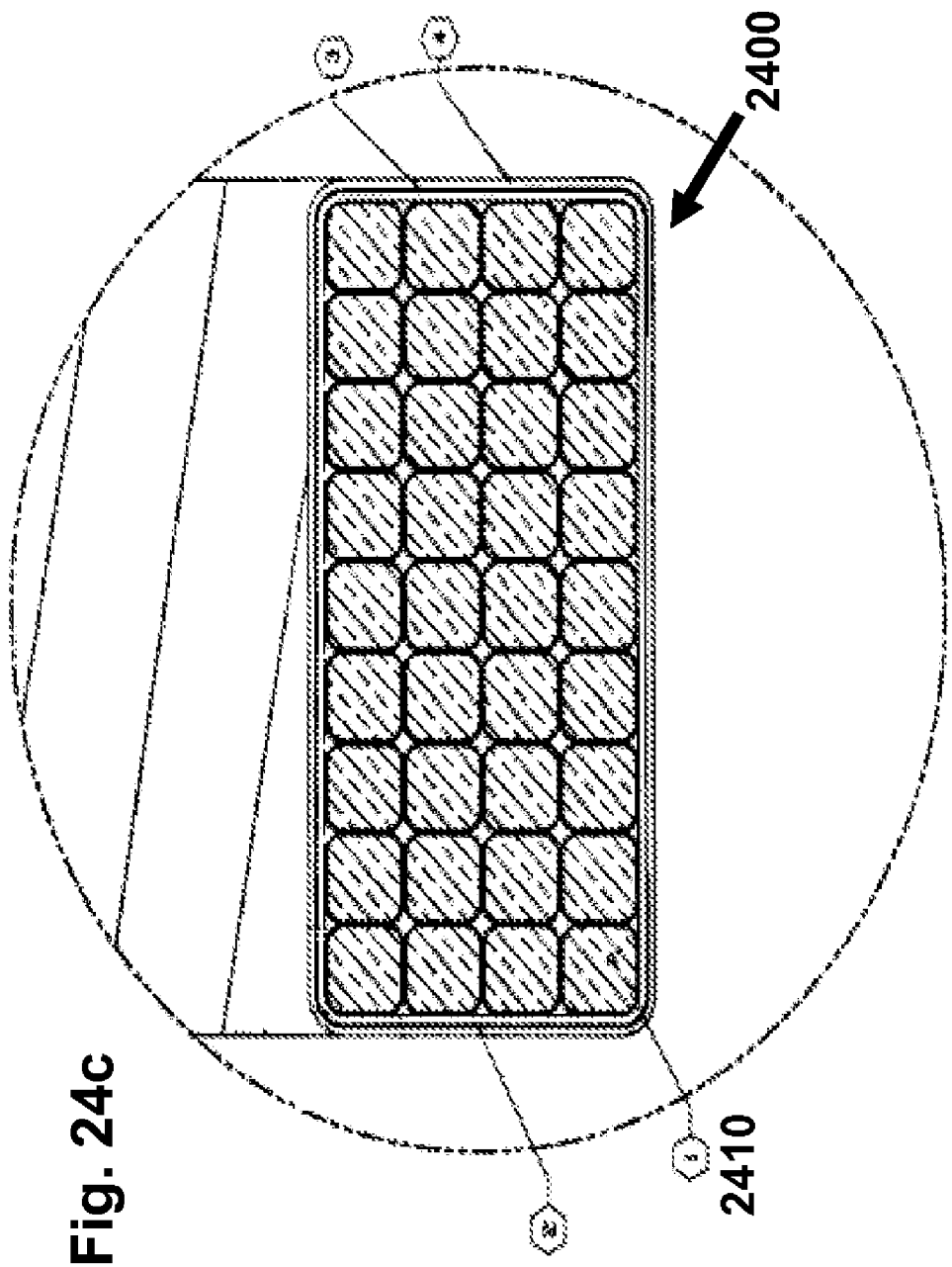

FIG. 24 illustrates a coil or winding 2400 used in the stator of an SR motor according to an exemplary embodiment. In FIG. 24a, the coil 2400 is shown with tape wrapped around the coil for insulation. The coil 2400 is typically made with insulated magnet wire, which has a generally square cross-section, as shown in the cross-section view of FIG. 24c. In an exemplary embodiment, the coil 2400 is four layers of nine turns of wire with a crossover on lead ends 2410 of the wire. Mica mats may be used to level off the lead ends 2410. Mica mats and glass coil tape may also be used for taping the wound coil of FIG. 24b to produce the fully taped coil 2450 of FIG. 24a. A varnishing sleeve 2420 may be placed to protect the lead ends, as shown in FIGS. 24a and 24b. The wound coils 2450 are then installed around the stator poles in the stator assembly as shown in FIGS. 21-22.

Once the wound coils 2450 are assembled into the stator assembly as shown in FIGS. 21-22, the entire stator assembly 1718 is then typically further insulated using a vacuum pressure impregnation (VPI) process, in which the stator assembly is flooded with epoxy resin under a vacuum, then the epoxy resin is pressurized to attempt to fill voids in the assembly 1718, finally baking the assembly to cure the epoxy. Use of such a VPI process helps eliminate destructive corona effects in voids, which are filled with the epoxy. In addition, the VPI process helps the coils 2450 adhere to the stator poles and provides a path for heat rejection.

Figure 25:
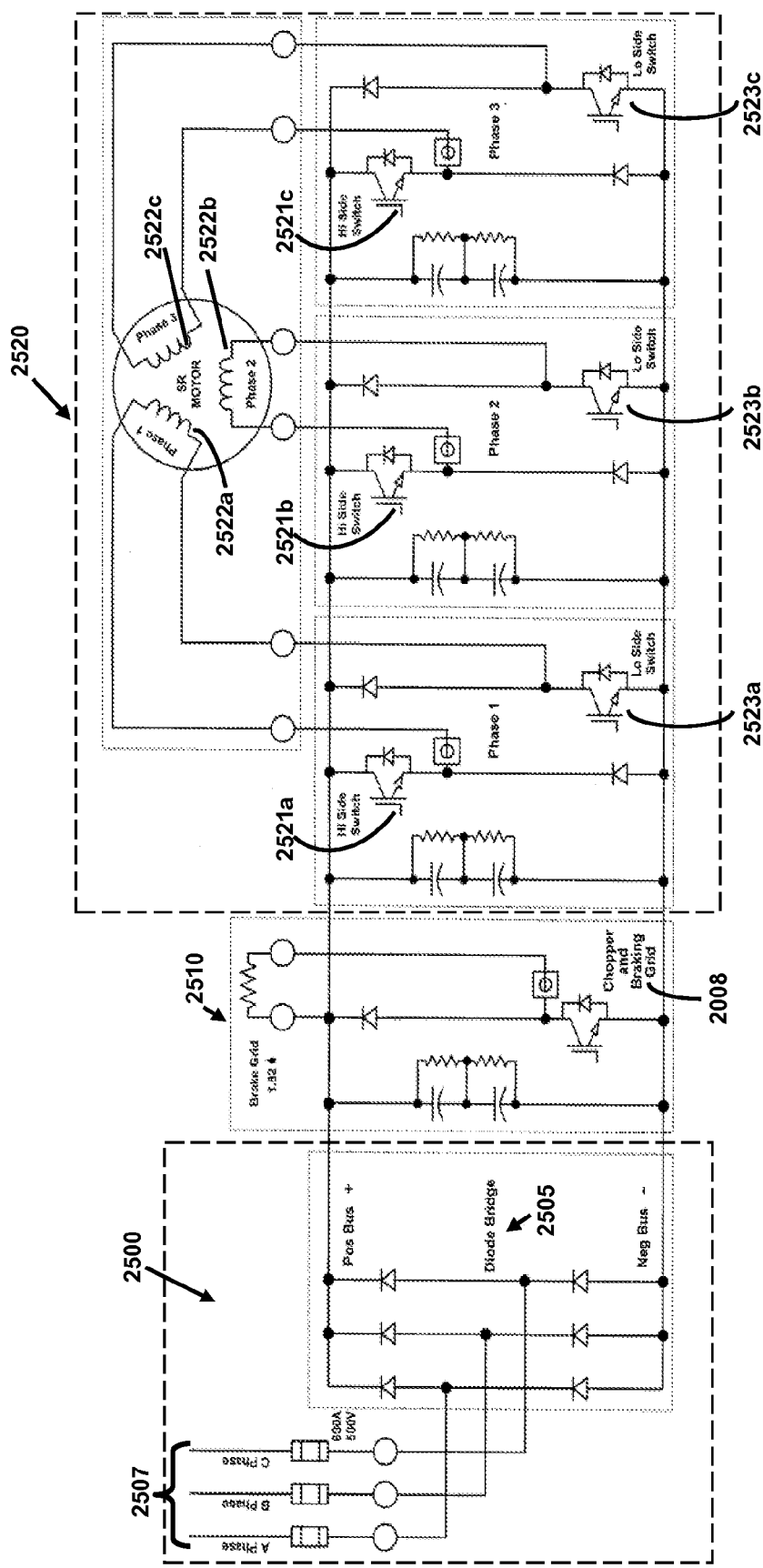
FIG. 25 is a schematic illustrating a power converter and motor according to an embodiment.

FIG. 25 is a schematic illustrating a combined rectifier circuit 2500, corresponding to the diode bridge 2003 of FIG. 20, chopper circuit 2510, corresponding to the chopper 2007 of FIG. 20, and SR converter and motor 2520, corresponding to the SR converter assembly 2005 and motor 1890 of FIG. 20. The rectifier circuit 2500 uses a diode bridge rectifier 2505 to rectify three-phase AC power 2507 to DC, creating the DC bus 2004 of FIG. 20. One skilled in the art will recognize that other rectification circuits may be used. As described above, the chopper circuit 2510 dumps braking energy into the braking grids 2008.

In an exemplary embodiment, an active front end allows using the excess energy through the generator 2002 of FIG. 20 to overdrive the diesel engine 2001 that drives the AC generator 2002, reducing load on the diesel engine 2001. In another embodiment, a connection to a power grid may allow the vehicle to return excess energy to the power grid. Another embodiment may store electrical power on board the vehicle 1500, using batteries or other electrical storage techniques.

The SR Converter itself is shown in block 2520 of FIG. 25. It consists of a high side and low side switch on each phase, connected to the DC bus 2004. When a phase is energized, current flows from the positive side of the bus 2004, through the high side switch 2521, through the coil 2522, through the low side switch 2523 to the negative side of the bus 2004. In a power or motoring mode, the phases are energized just ahead of the rotor position so that the rotor is constantly "chasing" the energized stator pole. This requires that the control knows what the rotor position is. This is achieved without sensors using a sensorless calculating method. If the motor is turning slow enough, the "off" phase may be given fixed diagnostic pulses. The amplitude of the pulses may vary with the change in inductance as the rotor turns, giving position information. As speed increases, there may not be enough time to generate diagnostic pulses. In this case, the calculations may change and the rate of rise of current may be used to determine position. With position information, speed can also be measured, giving both position and speed data for proper gating of the IGBT switches 2521 and 2523. In the braking mode, the stator energizing sequence actually "chases" the rotor, trying to draw it back, thus creating the braking force. In both motoring and braking, the current through the IGBT switches 2521 and 2523 and the coil 2522 is in the same direction unlike a conventional DC motor. The timing of the turn on/off with respect to the rotor position creates motoring and braking.

An SR motor can be used for stationary braking of a heavy-duty vehicle. By energizing and maintaining the energy in one coil of the SR motor, instead of turning on/off the coil as described above, the rotor will be rotated to align poles of the rotor with the stator poles energized by the coils 2522, then will stay in that position, holding the rotor stationary without creating mechanical wear, such as in a disc brake system.

Some of the benefits of SR technology include: (a) the motor is more robust than an AC or DC motor, since there are no coils on any of the moving parts of the motor; (b) the rotor inertia is much lower than in a DC armature or an AC rotor, giving benefits to gearing life, especially if there is frequent stopping and starting; (c) no commutator maintenance—there are no brushes or brush rigging; (d) stators are very similar to DC motor field poles; (e) smaller than DC motors with comparable horsepower; (f) simple and robust electronic controls compared to variable frequency AC; (g) high level of fault tolerance; (h) high speeds can be achieved, limited only by bearing and electro-magnetic timing constraints; (i) can operate at low speed providing full-rated torque down to zero speed; (j) maintains high efficiency over wide speed and load ranges; (k) system is inherently 4-quadrant and can run forward or backward as either a motor or generator; and (l) temperature sensitive components are stationary and therefore, easier to monitor. Other advantages may be found.

In one embodiment, such as shown above in FIG. 15, four SR traction motors 1510, one directly driving each wheel 1515, provide propulsion power for the vehicle 1500. By controlling the timing and magnitude of SR pole currents, the vehicle 1500 achieves an efficient and responsive tractive effort. Power for the traction system comes from a diesel driven AC generator 2002, as shown in FIG. 20. The diesel engine 2001 may run at a substantially constant predetermined speed, chosen for engine efficiency, and the AC generator provides a power input for the four SR converters and the generator field excitation VR converter as described in more detail below. Although a diesel engine is shown in FIG. 20, other types of engines may be used to drive the AC generator.

The SR converter 2520 utilizes IGBT switches 2521 and 2523 as its basic power switch. An IGBT switch is a transistor switch with tremendous power gain capabilities. A small amount of gate drive can turn on hundreds to thousands amperes of current, and when it is removed, current will turn off. Therefore, current through the motor coil 2522 can be precisely turned on and off, to provide optimum system performance. The current flows from the positive side of the bus 2004, through the high side switch 2521, through the stator coil 2522, through the low side switch 2523 to the negative side of the bus 2004. At the proper time, the "on" switches will turn off, and the subsequent phase switches will turn on, as shown above in FIGS. 4-10.

Figure 26:
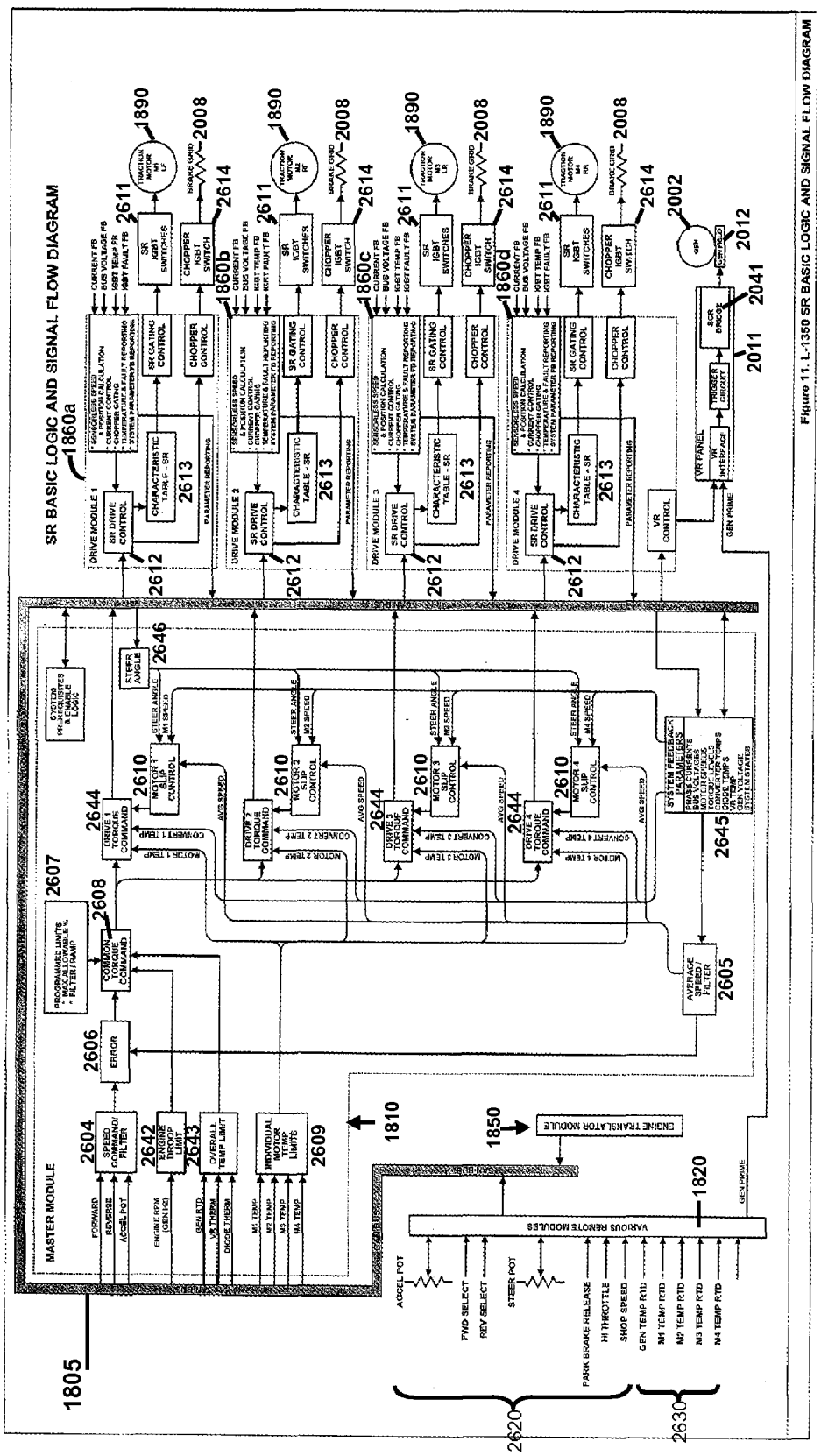
FIG. 26 is a block diagram illustrating basic logic and signal flow of an SR motor control system of an embodiment.

FIG. 26 illustrates an exemplary signal flow for the distributed control software of an exemplary embodiment. Remote modules 1820 located in the cab read the operator control elements 2620 (switches, accelerator potentiometer, direction select, park brake release, etc.). The appropriate remote modules 1820 located on the vehicle also read motor and generator temperature signals 2630. The remote modules 1820 convert data from these elements 2620 and signals 2630 converted into data that is given to the master module 1810 via the CAN bus 1805. The master 1810 then sends the various commands to the appropriate remote modules 1820 and drive modules 1830.

When the operator moves the engine select switch of the operator control elements 2620 to a high throttle position, the master module 1810 commands the engine 2001 to reach a predetermined operating speed. At the same time, 24 volts DC (battery voltage) is fed to the priming circuit, providing an initial current for the AC generator field 2012, and at the same time the VR SCR control 2011 turns on all the SCRs of an SCR bridge 2641 continuously.

As the AC generator 2002 voltage builds up to about 100 VAC, the VR converter 2011 begins controlled operation, ramping the generator voltage to its rated value. The ramping (typically about 3-4 seconds) provides a soft build up of bus voltage to limit the charging current of the bus capacitors. The priming function is then shut off and the VR 2011 has total regulation of the field excitation. As the load on the generator 2002 varies, the field 2012 current will adjust so that the proper voltage is maintained. The AC voltage may be limited as a function of the frequency of the generator 2002 so operation at lower engine rpm will maintain the generator at a proper volts/hertz level. This could occur if engine speed were slow to respond, or during shop mode and auxiliary power modes of operation. In an exemplary embodiment, the field excitation is regulated to maintain a voltage ratio of 8.6 volts per hertz below approximately 58 hertz. At 58 Hz, the voltage levels off at 500 VAC, which is maintained during the normal full power fluctuations of engine speed. Other embodiments may use different ramping, voltage ratios, frequencies, and VAC levels.

The distributed control system 1800 software operates on the basis of a "closed loop" system. In other words, a feedback is used to insure the response meets the command. When the operator depresses the accelerator pedal of the operator control element 2620, the vehicle is "commanded" to go a certain speed. This creates an overall speed command 2604 that will produce a common motor torque command 2608 to generate drive-specific torque commands 2609 to cause motor torque in the selected direction at the four traction wheel motors 1890. A small movement of the pedal initiates a small speed command 2604, resulting in a small change in torque command. A large movement will result in a high change in torque command. The common torque command 2608 actually is derived from the difference between the command speed and the actual speed. This difference is called an error 2606. As the vehicle approaches the commanded speed, the error 2606 decreases so the torque command 2608 will taper off. The actual speed achieved will be the commanded speed, less the error 2606 it takes to maintain the required torque. In an exemplary embodiment, the full pedal position represents 15 mph of vehicle speed. If the road surface is hard and level, almost 15 mph can be achieved because it takes only a small amount of torque to maintain it. If the vehicle is climbing a hill, is on under-footing having high rolling resistance, carrying heavy loads, or whatever condition may be present that requires higher torque, a lesser speed may be achieved. Other embodiments may have different full pedal speeds. The full pedal speed may be limited below actual vehicle capability for safety or other reasons.

The operator interface to the drive system is through sensors and switch inputs to remote modules 1820 and the data bus 2004. A direction select switch, accelerator pedal, park brake switch, engine select switch, etc. of operator controls 2620 are coupled to remote modules 1820 in the cab. In an exemplary embodiment, three cab remote modules 1820 are used. Data from the operator interface 2620 are passed as data to the master module 1810, and then, after performing the necessary calculation and control functions, the master module 1810 passes data to the drive modules 1860.

The master module 1810 creates all the control functions that allow the four drive modules 1860 and SR converters 1870 to work as an integrated system. As the operator works the accelerator pedal, the difference between the command speed 2604 and the actual speed creates a common torque command 2608 to all four drives, as described above. The four wheel speeds are averaged (2605) to obtain an overall vehicle speed which is used to null the common torque 2608 as commanded speed is reached. The common torque command 2608 is also modified to compensate for machine variables that require a reduction in torque. These may include programmed torque ramps and filters 2607, engine loading limits 2642, and temperature limits 2643 relating to the VR and generator. Other variables may be used. Individual limits relating to wheel slip and temperature constraints 2609 are directed to the individual drives.

When the machine is traveling at a given speed, and the accelerator is released, an error 2606 is created that says the machine is traveling faster than commanded. This error 2606 creates a braking torque to reduce the machine speed. With an SR motor system such as illustrated in FIG. 11, braking is substantially instantaneous because there are no currents to reduce or switch directions. Braking torque is achieved by simply changing the timing of the converter firing to following behind the rotor movement, "pulling it back" to reduce its speed. Conventional DC motor systems introduce a lag time because of the need to reduce or switch current directions.

The common torque command 2608 is then split into individual motor and drive torque commands 2609 for the four wheels. The individual commands 2609 take in system feedback parameters 2645 that relates to that particular drive. For instance, if one drive is indicating a motor or converter temperature that is climbing above safe values, that drive goes through a cutback, alarm and eventually a shutdown if the condition is not corrected.

The slip limit control 2610 is also fed to a particular offending drive. The four motor speeds are averaged in block 2605 and compared to each individual speed. If an individual speed goes beyond a prescribed limit, the command 2644 to that drive is reduced to prevent the wheel from going beyond that limit. This then controls the wheel slippage, enhancing tire life. The allowable limits are modified with steer angle and overall speed. The steer angle input 2646 gives the system information, so during a turn, the outside wheels are allowed to go faster than the inside. As the overall speed of the vehicle increases, slip control is relaxed to allow for wheel speed differences due to tire wear.

The local individual SR motor control logic 2612 is embedded in the drive module cards 1860. In one embodiment, this control 2612 relies on motor characteristics and limits that are programmed into the control code. These are originally done through a characterization of the motor 2613, where phase turn-on and turn-off time and angle are established for the full range of operating speeds and current levels. The sensor-less position information is also a part of the characterization process. With this information programmed into the drive module 1860, proper triggering of the IGBTs 2611 for the various speed and torque demands may be achieved.

The SR control logic 2612 also reads bus voltage to ensure it does not fluctuate beyond safe levels. As bus voltage rises, the chopper IGBT 2614 turns on to dump excess energy into the braking grids. In one embodiment, the chopper 2001 turns on when the bus voltage rises above 740 VDC, and off when it goes below 720 VDC. The length of the on versus off time determines the amount of energy dumped, and this is controlled directly as a function of bus voltage. In one embodiment, an over-voltage fault and a system shutdown occurs if bus voltage exceeds 800 VDC.

The SR control 2612 also monitors temperature and IGBT faults and reports them to the master 1810. Appropriate shutdowns are implemented for the various faults. One skilled in the art will recognize that other signal flows and control techniques may be used.

Figure 27A:
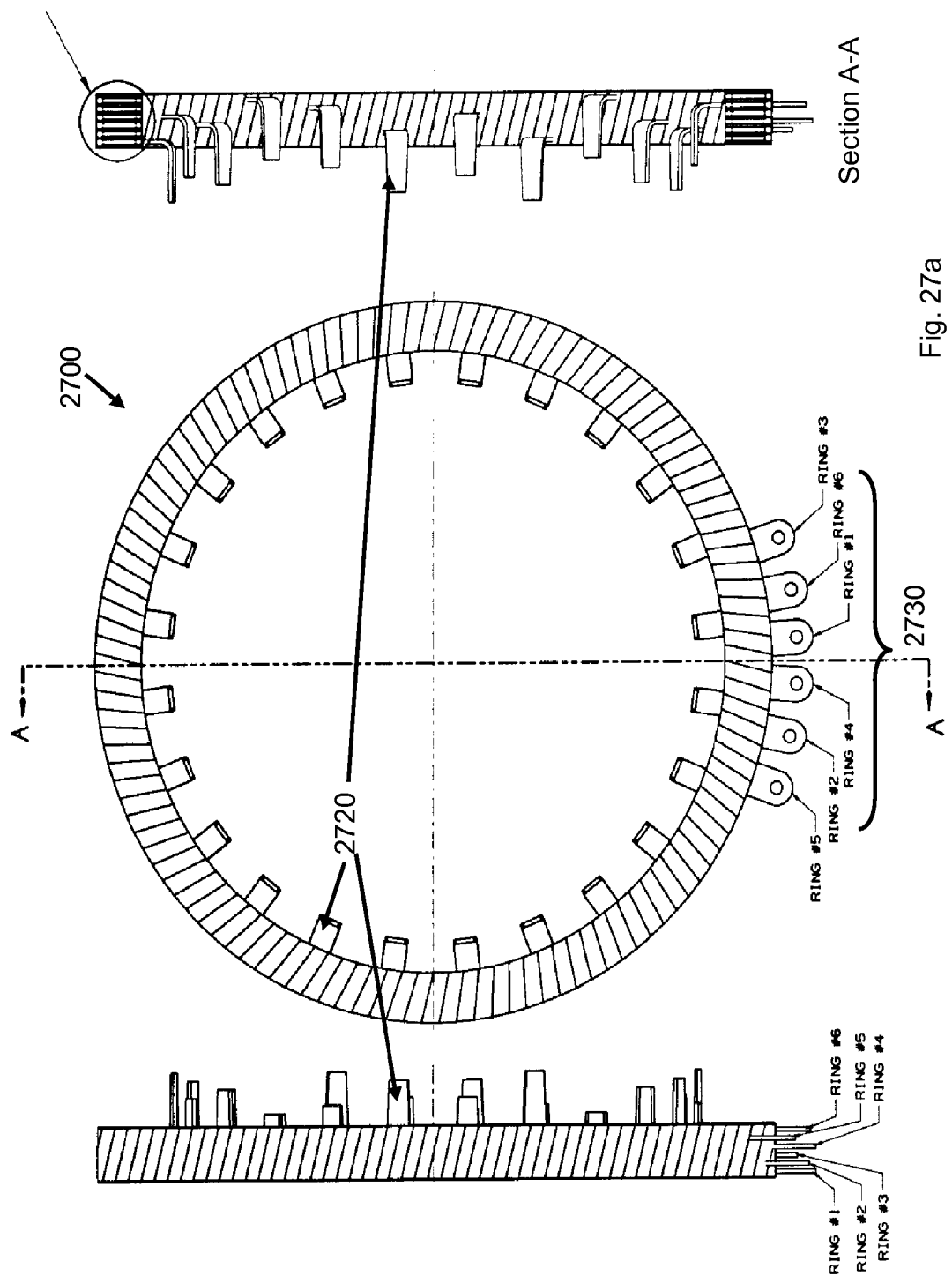

FIGS. 27a-27c are views of a phase ring 2700, corresponding to the phase ring 2110 of FIG. 21, for use in an embodiment of the stator 1718 to route wiring to the coil windings. As shown in FIGS. 27a-27c, a phase ring for a 12 stator pole, three phase stator 1718 is shown. Similar phase rings may be used for stators with different numbers of poles or phases, by changing the number of rings 2710 and tabs 2720 on the rings 2710.

FIG. 27a provides a top view, a side view, and a section view around line A-A of an assembled phase ring 2700. Six phase ring sections 2710a-2710f each provide four tabs 2720 and a connector 2730. The tabs 2720 provide electrical connectivity with one lead 2410 of the four equally spaced stator coils 2450 for one of the three phases, while providing a single electrical external connector for a large wire to connect the SR motor to the power electronics. Rings 2710a and 2710b connect to the stator coils 2450 for a first phase, rings 2710c and 2710d connect to the stator coils 2450 for a second phase, and rings 2710e and 2710f connect to the stator coils 2450 for a third phase. In one embodiment, rings 2710a, 2710c, 2710e are identical as manufactured, as are rings 2710b, 2710d, and 2710f, each with three connectors 2730. During assembly, the appropriate two of the three connectors 2730 are removed from each ring 2710 to configure each ring 2710 for the desired phase of the SR motor.

For assembly, each ring 2710 is wrapped with insulation, such as an 80% lap mica mat tape, providing insulation between the rings 2710 when they are stacked as shown in FIG. 27c, with ring separators 2740 providing additional separation and insulation between each ring 2710. The assembled phase ring assembly 2700 may then be again taped with insulation, such as a 60% lap glass tape, before placement into the stator to connect with the stator coils 2450.

Figure 28:
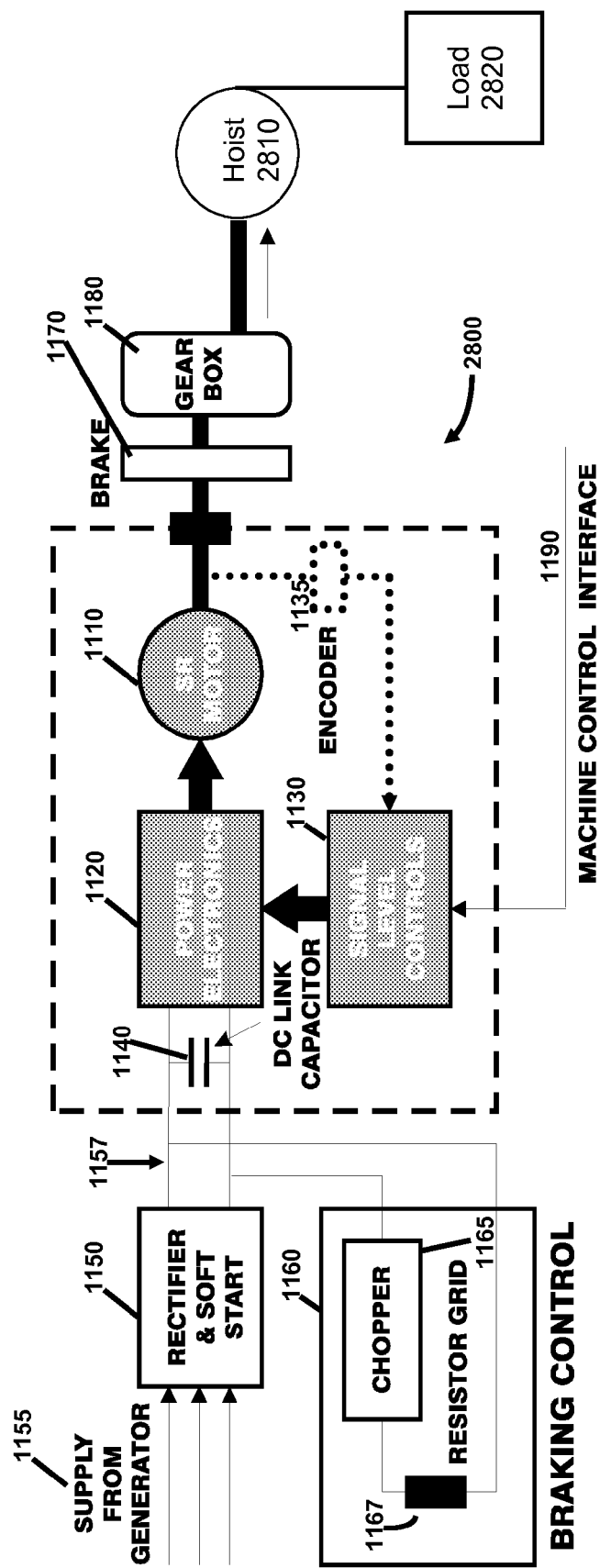
FIG. 28 is a block diagram of an exemplary SR motor system for a heavy-duty hoisting apparatus.

FIG. 28 is a block diagram of an exemplary heavy-duty hoisting apparatus. Instead of a wheel, as in FIG. 11, the SR motor system of the apparatus 2800 of FIG. 28 drives a hoist 2810, such as a conventional winch, for lifting a load 2820. A distributed control system 1800 may be used to control the heavy-duty hoisting apparatus of FIG. 28. In some embodiments, an engine and generator such as described above may be used to power the SR motor system of FIG. 28. In other embodiments, the SR motor system may be connected to an external power source, such as a power grid.

The SR motor system of FIG. 28 may use the capability of stationary braking described above to avoid problems conventional hoisting apparatus have when lifting a load of an unknown weight. To avoid undesired vertical movement when moving a load 2820, the SR motor system may be locked in place by energizing less than all of the stator poles, then providing the correct torque to lift or lower the load 2820. In a conventional hoisting apparatus, unless sufficient torque is provided by the driving DC or AC motor, where the amount of torque needed may not be predeterminable because of an unknown weight of the load 2820, undesirable vertical movement may occur. Because the SR motor can be locked into a fixed rotational position as described above, this undesirable movement can be eliminated.

The foregoing disclosure and description of the invention are illustrative and explanatory thereof, and various changes in the details of the illustrated apparatus and construction and the method of operation may be made without departing from the spirit of the invention.

We claim:

1. A heavy-duty hoisting apparatus adapted for use in an industrial environment, comprising:
   a heavy-duty frame;
   a hoisting mechanism mounted with the heavy-duty frame;
   a switched reluctance (SR) motor operably engaging the hoisting mechanism for lifting and lowering a load; and
   a digital control system coupled to the SR motor adapted to control the SR motor individually and to control the hoisting mechanism.

2. The heavy-duty hoisting apparatus of claim 1, further comprising:
   an engine mounted with the heavy duty frame; and
   an electrical generator operatively engaged with and driven by the engine;
   wherein the SR motor is powered by the electrical generator.

3. The heavy-duty hoisting apparatus of claim 2, wherein the electrical generator is an alternating current (AC) generator.

4. The heavy-duty hoisting apparatus of claim 2, further comprising:
   a power feedback system, adapted to drive the engine from excess electrical power fed back to the electrical generator.

5. The heavy-duty hoisting apparatus of claim 1, wherein the SR motor is powered from a power source external to the heavy-duty hoisting apparatus.

6. The heavy-duty vehicle of claim 1, further comprising:
   a chopping system, adapted to dissipate excess DC voltage.

7. The heavy-duty hoisting apparatus of claim 1 further comprising:
   a power storage system, adapted to store excess DC voltage.

8. The heavy-duty hoisting apparatus of claim 1, further comprising:
   an operator control system, adapted to provide an operator of the hoisting apparatus with operational control over the hoisting mechanism.

9. The heavy-duty hoisting apparatus of claim 1, the digital control system comprising:
   a master unit, adapted to receive commands from the operator control system;
   a drive remote unit, coupled to the SR motor;
   a network, coupled to the master unit and the remote unit, adapted for message transmission between the master unit and the remote unit.

10. The heavy-duty hoisting apparatus of claim 9, further comprising:
    an AC to direct current (DC) power converter, coupled between the electrical generator and the SR motor,
    wherein the drive remote unit is further coupled to the AC to DC power converter and to the network, and
    wherein the master unit is further adapted to control operating parameters of the AC to DC power converter via the drive remote unit.

11. The heavy-duty hoisting apparatus of claim 1, the SR motor further adapted to provide stationary braking for the hoisting mechanism.

* * * * *